United States Patent
Zhang et al.

(10) Patent No.: US 9,781,382 B2
(45) Date of Patent: Oct. 3, 2017

(54) METHOD FOR DETERMINING SMALL-OBJECT REGION, AND METHOD AND APPARATUS FOR INTERPOLATING FRAME BETWEEN VIDEO FRAMES

(71) Applicant: Huawei Technologies Co., Ltd., Shenzhen (CN)

(72) Inventors: Lei Zhang, Beijing (CN); Zhigang Yao, Shenzhen (CN); Qingpeng Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/959,341

(22) Filed: Dec. 4, 2015

(65) Prior Publication Data

US 2016/0127678 A1   May 5, 2016

Related U.S. Application Data

(63) Continuation of application No. PCT/CN2014/075717, filed on Apr. 18, 2014.

(30) Foreign Application Priority Data

Jun. 5, 2013   (CN) .......................... 2013 1 0222076

(51) Int. Cl.
*H04N 7/01*   (2006.01)
*H04N 19/527*   (2014.01)
(Continued)

(52) U.S. Cl.
CPC ............. *H04N 7/014* (2013.01); *H04N 5/145* (2013.01); *H04N 7/0117* (2013.01);
(Continued)

(58) Field of Classification Search
CPC .... H04N 7/014; H04N 7/0117; H04N 7/0125; H04N 7/0127; H04N 5/145; H04N 19/521; H04N 19/527
(Continued)

(56) References Cited

U.S. PATENT DOCUMENTS 5,642,166 A   6/1997   Shin et al.
2006/0291561 A1   12/2006   Seong et al.
(Continued)

FOREIGN PATENT DOCUMENTS

| CN | 1885946 A | 12/2006 |
| JP | 2005229154 A | 8/2005 |
| TW | 201322768 A | 6/2013 |

OTHER PUBLICATIONS

Foreign Communication From a Counterpart Application, PCT Application No. PCT/CN2014/075717, English Translation of International Search Report dated Jul. 23, 2014, 2 pages.
(Continued)

*Primary Examiner* — Michael Lee
*Assistant Examiner* — Omer Khalid
(74) *Attorney, Agent, or Firm* — Conley Rose, P.C.

(57) ABSTRACT

A method and an apparatus for determining a small-object region in a video frame. The method includes dividing a current video frame into at least two regions, and determining a global motion vector corresponding to each region; determining an interframe motion vector of each group of adjacent frames in multiple video frames that include the current video frame and a reference frame of the current video frame; determining a candidate small-object region in the current video frame according to the interframe motion vector of the each group of adjacent frames and the determined global motion vector corresponding to each region; and performing filtering on the candidate small-object
(Continued)

region in the current video frame, and determining a region obtained after the filtering as a small-object region in the current video frame.

8 Claims, 14 Drawing Sheets

(51) Int. Cl.
*H04N 19/577* (2014.01)
*H04N 19/567* (2014.01)
*H04N 19/513* (2014.01)
*H04N 5/14* (2006.01)

(52) U.S. Cl.
CPC ......... *H04N 7/0125* (2013.01); *H04N 7/0127* (2013.01); *H04N 19/521* (2014.11); *H04N 19/527* (2014.11); *H04N 19/567* (2014.11); *H04N 19/577* (2014.11)

(58) Field of Classification Search
USPC .......................................... 348/441
See application file for complete search history.

(56) References Cited

U.S. PATENT DOCUMENTS

2011/0211111 A1* 9/2011 Mishima ................... G06T 3/40
348/441
2013/0135524 A1* 5/2013 Chang .................. H04N 7/0127
348/441

OTHER PUBLICATIONS

Foreign Communication From a Counterpart Application, PCT Application No. PCT/CN2014/075717, English Translation of Written Opinion dated Jul. 23, 2014, 13 pages.
Ojo, O., et al., "Robust Motion-Compensated Video Upconversion," Nov. 1997, pp. 1045-1056.
Dane, G., et al., "Motion Vector Processing for Frame Rate Up Conversion," ICASSP 2004, pp. 309-312.
Choi, B., et al., "Motion-Compensated Frame Interpolation Using Bilateral Motion Estimation and Adaptive Overlapped Block Motion Compensation," IEEE Transactions of Circuits and Systems for Video Technology, vol. 17, No. 4, Apr. 2007, pp. 407-416.
Foreign Communication From a Counterpart Application, European Application No. 14806792.9, Extended European Search Report dated Apr. 21, 2016, 11 pages.

* cited by examiner

METHOD FOR DETERMINING SMALL-OBJECT REGION, AND METHOD AND APPARATUS FOR INTERPOLATING FRAME BETWEEN VIDEO FRAMES

CROSS-REFERENCE TO RELATED APPLICATIONS

This application is a continuation of International Application No. PCT/CN2014/075717, filed on Apr. 18, 2014, which claims priority to Chinese Patent Application No. 201310222076.4, filed on Jun. 5, 2013, both of which are hereby incorporated by reference in their entireties.

TECHNICAL FIELD

The present disclosure relates to the field of video processing technologies, and in particular, to a method and an apparatus for determining a small-object region in a video frame, and a method and an apparatus for interpolating a frame between two adjacent video frames.

BACKGROUND

In an application of video technologies, to ensure that a high-definition video or an ultra-high-definition video is played smoothly, a frame rate at which a terminal plays video frames needs to reach at least 120 hertz (Hz), but a frame rate of video coding transmission can reach only 25 Hz to 30 Hz because of the transmission bandwidth limitation, and therefore, the terminal that plays the high-definition video or the ultra-high-definition video has to interpolate a new video frame between received video coding original frames, to implement frame rate conversion.

Currently, the terminal that plays the high-definition video or the ultra-high-definition video generally first performs motion estimation on the received original frames (that is, motion estimation is performed on each block included in the original frames), and then generates, according to bidirectional motion vectors that are between two adjacent frames and that are obtained through the motion estimation, a new video frame (an interpolated frame) that is interpolated between the two adjacent frames. To enable the interpolated frame to have desirable continuity with the neighboring frames, smooth filtering needs to be performed on the bidirectional motion vectors that are between the two adjacent frames and that are obtained according to the motion estimation, and the interpolated frame is generated according to bidirectional motion vectors that are between the two adjacent frames and that are obtained after the smooth filtering.

When an original frame includes a small-object region, and when smooth filtering is performed on a motion vector obtained after motion estimation is performed on the original frame, a motion vector corresponding to the small-object region in the original frame may be replaced by a background motion vector of the original frame. In addition, currently, there is no method by using which a small-object region in a video frame can be determined, and when the motion vector corresponding to the small-object region in the original frame is replaced by the background motion vector of the original frame, a pixel of the small-object region is absent in the interpolated frame that is generated according to the motion vector corresponding to the original frame, thereby affecting playback quality of the high-definition video or the ultra-high-definition video. A region that is in an original frame and that meets any one of the following features is referred to as a small-object region: an object region of which a proportion to an original frame background is less than a specific value, an object region of which a motion direction is inconsistent with that of an original frame background and of which a proportion to the original frame background is less than a specific value, an object region of which a luminance value is close to a luminance value of an original frame background and of which a proportion to the original frame background is less than a specific value, or an object region of which a motion direction is inconsistent with that of an original frame background, of which a luminance value is close to a luminance value of the original frame background, and of which a proportion to the original frame background is less than a specific value.

In conclusion, currently, when an original frame includes a small-object region, there is no method by using which a small-object region in a video frame can be determined. In addition, when smooth filtering is performed on a motion vector obtained after motion estimation is performed on the original frame, a motion vector corresponding to the small-object region in the original frame may be replaced by a background motion vector of the original frame, which causes absence of a small-object pixel in a generated interpolated frame, thereby affecting playback quality of a high-definition video or an ultra-high-definition video.

SUMMARY

Embodiments of the present disclosure provide a method and an apparatus for determining a small-object region in a video frame, so as to determine, in the video frame, the small-object region included in the video frame relatively accurately.

The embodiments of the present disclosure further provide a method and an apparatus for interpolating a frame between two adjacent video frames, so as to avoid a problem of low playback quality of a high-definition video or an ultra-high-definition video caused by absence of pixels of the small-object in a generated interpolated frame.

According to a first aspect, a method for determining a small-object region in a video frame is provided, including dividing a current video frame into at least two regions, and determining a global motion vector corresponding to each region; determining an interframe motion vector of each group of adjacent frames in multiple video frames that include the current video frame and a reference frame of the current video frame; determining a candidate small-object region in the current video frame according to the determined interframe motion vector of the each group of adjacent frames in the multiple video frames that include the current video frame and the reference frame of the current video frame and the determined global motion vector corresponding to each region; and performing filtering on the candidate small-object region in the current video frame, and determining a region obtained after the filtering as a small-object region in the current video frame; where the reference frame of the current video frame includes one or more of preceding continuous video frames of the current video frame and following continuous video frames of the current video frame.

With reference to the first aspect, in a first possible implementation manner, before the determining an interframe motion vector of each group of adjacent frames in multiple video frames that include the current video frame and a reference frame of the current video frame, the method further includes, for a to-be-processed picture block included in each video frame in the each group of adjacent frames in the multiple video frames that include the current video frame and the reference frame of the current video frame, executing the following: selecting at least one video frame from preceding N video frames of the current video frame; determining, according to a small-object region determined in the preceding N video frames of the current video frame, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block; and the determining an interframe motion vector of each group of adjacent frames in multiple video frames that include the current video frame and a reference frame of the current video frame includes separately determining an interframe motion vector of each first-type to-be-processed picture block and an interframe motion vector of each second-type to-be-processed picture block; and using the determined interframe motion vector of each first-type to-be-processed picture block included in each video frame in the each group of adjacent frames and the determined interframe motion vector of each second-type to-be-processed picture block included in each video frame in the each group of adjacent frames as the interframe motion vector of the each group of adjacent frames.

With reference to the first possible implementation manner of the first aspect, in a second possible implementation manner, the determining an interframe motion vector of each first-type to-be-processed picture block includes determining a value of a dissimilarity between each candidate motion vector corresponding to the first-type to-be-processed picture block and a background motion vector of a video frame in which the first-type to-be-processed picture block is located; assigning a corresponding weight to each candidate motion vector according to the determined value of the dissimilarity corresponding to each candidate motion vector by using a rule that a smaller weight is assigned to a larger value of the dissimilarity; and determining the interframe motion vector of the first-type to-be-processed picture block according to the weight assigned to each candidate motion vector and a sum of absolute differences (SAD) value of pixels of a picture block pointed to by each candidate motion vector and pixels of the first-type to-be-processed picture block.

With reference to the first possible implementation manner of the first aspect or the second possible implementation manner of the first aspect, in a third possible implementation manner, the selecting at least one video frame from preceding N video frames of the current video frame includes selecting at least one preceding continuous video frame of the current video frame.

With reference to the second possible implementation manner of the first aspect or the third possible implementation manner of the first aspect, in a fourth possible implementation manner, the determining the interframe motion vector of the first-type to-be-processed picture block includes, for each candidate motion vector, determining a product of the weight assigned to the candidate motion vector and the SAD value of the pixels of the picture block pointed to by the candidate motion vector and the pixels of the first-type to-be-processed picture block, and using a candidate motion vector with a smallest product as the interframe motion vector of the first-type to-be-processed picture block.

With reference to any one of the first to the fourth possible implementation manners of the first aspect, in a fifth possible implementation manner, the determining a candidate small-object region in the current video frame includes determining, in each reference frame of the current video frame and according to the interframe motion vector of the each group of adjacent frames in the multiple video frames that include the current video frame and the reference frame of the current video frame, a matching block corresponding to each picture block included in the current video frame; determining, in each reference frame, a nearby block near the matching block, and determining an interframe motion vector of each nearby block determined in each reference frame; for each picture block included in the current video frame, determining a value of a similarity between the interframe motion vector of each nearby block determined for the picture block and an interframe motion vector of the picture block, and determining a value of a dissimilarity between the interframe motion vector and a global motion vector that are of each nearby block; and determining, according to the determined value of the similarity and the determined value of the dissimilarity, a picture block included in the candidate small-object region in the current video frame, where each picture block included in the candidate small-object region meets the following: in multiple nearby blocks that are determined for the picture block and that are included in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

With reference to any one of the first to the fifth possible implementation manners of the first aspect, in a sixth possible implementation manner, before the performing filtering on the candidate small-object region in the current video frame, the method further includes marking a specific marker on each picture block included in the candidate small-object region; and the performing filtering on the candidate small-object region in the current video frame, and determining a region obtained after the filtering as a small-object region in the current video frame includes, for each picture block included in the candidate small-object region in the current video frame, determining a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block; removing the specific marker of the picture block when the determined value of the first quantity or the determined value of the second quantity is greater than a third threshold; determining a value of a third quantity of picture blocks that are marked with the specific marker and that are in a third set range around the picture block; removing the specific marker of the picture block when the determined value of the third quantity is less than a fourth threshold; and determining the picture block that is marked with the specific marker and that is in the current video frame as the small-object region in the current video frame; where the third set range is smaller than the first set range and the second set range, and the fourth threshold is less than the third threshold.

According to a second aspect, a method for interpolating a frame between two adjacent video frames based on the foregoing method for determining a small-object region in a video frame is provided, including determining a small-object region in a former video frame and a small-object region in a latter video frame, where the former video frame and the latter video frame are two consecutively adjacent video frames; performing smooth filtering on an interframe motion vector corresponding to a region except the small-object region in the former video frame and the small-object region in the latter video frame; and interpolating a frame between the two consecutively adjacent video frames according to an interframe motion vector corresponding to the small-object region in the former video frame, an interframe motion vector corresponding to the small-object region in the latter video frame, and an interframe motion vector obtained after the smooth filtering.

According to a third aspect, a method for interpolating a frame between two adjacent video frames based on the foregoing method for determining a small-object region in a video frame is provided, including classifying, according to a to-be-processed picture block included in a small-object region in preceding N video frames of two consecutively adjacent video frames, to-be-processed picture blocks included in each video frame of the two consecutively adjacent video frames into a first-type to-be-processed picture block and a second-type to-be-processed picture block; separately determining an interframe motion vector of each first-type to-be-processed picture block and an interframe motion vector of each second-type to-be-processed picture block, and using the determined interframe motion vector of each first-type to-be-processed picture block included in each video frame of the two consecutively adjacent video frames and the determined interframe motion vector of each second-type to-be-processed picture block included in each video frame of the two consecutively adjacent video frames as an interframe motion vector between the two consecutively adjacent video frames; and interpolating a frame between the two consecutively adjacent video frames according to the obtained interframe motion vector between the two consecutively adjacent video frames, where N is a positive integer.

With reference to the third aspect, in a first possible implementation manner, the classifying, according to a to-be-processed picture block included in a small-object region in preceding N video frames of two consecutively adjacent video frames, to-be-processed picture blocks included in each video frame of the two consecutively adjacent video frames into a first-type to-be-processed picture block and a second-type to-be-processed picture block includes, for the to-be-processed picture block included in each video frame of the two consecutively adjacent video frames, executing the following: selecting at least one video frame from the preceding N video frames of the two consecutively adjacent video frames; determining, according to the small-object region in the preceding N video frames of the two consecutively adjacent video frames, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

With reference to the first possible implementation manner of the third aspect, in a second possible implementation manner, the determining an interframe motion vector of each first-type to-be-processed picture block includes determining a value of a dissimilarity between each candidate motion vector corresponding to the first-type to-be-processed picture block and a background motion vector of a video frame in which the first-type to-be-processed picture block is located; assigning a corresponding weight to each candidate motion vector according to the determined value of the dissimilarity corresponding to each candidate motion vector by using a rule that a smaller weight is assigned to a larger value of the dissimilarity; and determining the interframe motion vector of the first-type to-be-processed picture block according to the weight assigned to each candidate motion vector and a SAD value of pixels of a picture block pointed to by each candidate motion vector and pixels of the first-type to-be-processed picture block.

With reference to the first possible implementation manner of the third aspect or the second possible implementation manner of the third aspect, in a third possible implementation manner, the selecting at least one video frame from the preceding N video frames includes selecting at least one preceding continuous video frame of the two consecutively adjacent video frames.

With reference to the second possible implementation manner or the third possible implementation manner of the third aspect, in a fourth possible implementation manner, the determining the interframe motion vector of the first-type to-be-processed picture block includes, for each candidate motion vector, determining a product of the weight assigned to the candidate motion vector and the SAD value of the pixels of the picture block pointed to by the candidate motion vector and the pixels of the first-type to-be-processed picture block, and using a candidate motion vector with a smallest product as the interframe motion vector of the first-type to-be-processed picture block.

According to a fourth aspect, an apparatus for determining a small-object region in a video frame is provided, including a global motion vector determining unit configured to divide a current video frame into at least two regions, determine a global motion vector corresponding to each region, and transmit the determined global motion vector to a region determining unit; an interframe motion vector determining unit configured to determine an interframe motion vector of each group of adjacent frames in multiple video frames that include the current video frame and a reference frame of the current video frame, and transmit the determined interframe motion vector to the region determining unit; the region determining unit configured to determine information about a candidate small-object region in the current video frame according to the interframe motion vector that is of the each group of adjacent frames in the multiple video frames that include the current video frame and the reference frame of the current video frame and that is from the interframe motion vector determining unit and the global motion vector that is corresponding to each region and that is from the global motion vector determining unit, and transmit the information about the determined candidate small-object region in the current video frame to a processing unit; and the processing unit configured to determine the candidate small-object region in the current video frame according to the information that is about the candidate small-object region in the current video frame and that is from the region determining unit, perform filtering on the candidate small-object region in the current video frame, and determine a region obtained after the filtering as a small-object region in the current video frame; where the reference frame of the current video frame includes one or more of preceding continuous video frames of the current video frame and following continuous video frames of the current video frame.

With reference to the fourth aspect, in a first possible implementation manner, the apparatus further includes a classification unit configured to execute, before the interframe motion vector of the each group of adjacent frames in the multiple video frames that include the current video frame and the reference frame of the current video frame is determined, the following for a to-be-processed picture block included in each video frame in the each group of adjacent frames in the multiple video frames that include the current video frame and the reference frame of the current video frame: selecting at least one video frame from preceding N video frames of the current video frame; determining, according to a small-object region determined in the preceding N video frames of the current video frame, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block; and the interframe motion vector determining unit is configured to separately determine an interframe motion vector of each first-type to-be-processed picture block and an interframe motion vector of each second-type to-be-processed picture block; and use the determined interframe motion vector of each first-type to-be-processed picture block included in each video frame in the each group of adjacent frames and the determined interframe motion vector of each second-type to-be-processed picture block included in each video frame in the each group of adjacent frames as the interframe motion vector of the each group of adjacent frames.

With reference to the first possible implementation manner of the fourth aspect, in a second possible implementation manner, the interframe motion vector determining unit is configured to determine a value of a dissimilarity between each candidate motion vector corresponding to the first-type to-be-processed picture block and a background motion vector of a video frame in which the first-type to-be-processed picture block is located; assign a corresponding weight to each candidate motion vector according to the determined value of the dissimilarity corresponding to each candidate motion vector by using a rule that a smaller weight is assigned to a larger value of the dissimilarity; and determine the interframe motion vector of the first-type to-be-processed picture block according to the weight assigned to each candidate motion vector and a SAD value of pixels of a picture block pointed to by each candidate motion vector and pixels of the first-type to-be-processed picture block.

With reference to the first possible implementation manner or the second possible implementation manner of the fourth aspect, in a third possible implementation manner, the classification unit is configured to select at least one preceding continuous video frame of the current video frame.

With reference to the second possible implementation manner or the third possible implementation manner of the fourth aspect, in a fourth possible implementation manner, the interframe motion vector determining unit is configured to, for each candidate motion vector, determine a product of the weight assigned to the candidate motion vector and the SAD value of the pixels of the picture block pointed to by the candidate motion vector and the pixels of the first-type to-be-processed picture block, and use a candidate motion vector with a smallest product as the interframe motion vector of the first-type to-be-processed picture block.

With reference to any one of the first to the fourth possible implementation manners of the fourth aspect, in a fifth possible implementation manner, the region determining unit is configured to determine, in each reference frame of the current video frame and according to the interframe motion vector of the each group of adjacent frames in the multiple video frames that include the current video frame and the reference frame of the current video frame, a matching block corresponding to each picture block included in the current video frame; determine, in each reference frame, a nearby block near the matching block, and determine an interframe motion vector of each nearby block determined in each reference frame; for each picture block included in the current video frame, determine a value of a similarity between the interframe motion vector of each nearby block determined for the picture block and an interframe motion vector of the picture block, and determine a value of a dissimilarity between the interframe motion vector and a global motion vector that are of each nearby block; and determine, according to the determined value of the similarity and the determined value of the dissimilarity, a picture block included in the candidate small-object region in the current video frame, where each picture block included in the candidate small-object region meets the following: in multiple nearby blocks that are determined for the picture block and that are included in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

With reference to any one of the first to the fifth possible implementation manners of the fourth aspect, in a sixth possible implementation manner, the apparatus further includes a marking unit configured to mark, before filtering is performed on the candidate small-object region in the current video frame, a specific marker on each picture block included in the candidate small-object region; and the processing unit is configured to, for each picture block included in the candidate small-object region in the current video frame, determine a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block; remove the specific marker of the picture block when the determined value of the first quantity or the determined value of the second quantity is greater than a third threshold; determine a value of a third quantity of picture blocks that are marked with the specific marker and that are in a third set range around the picture block; remove the specific marker of the picture block when the determined value of the third quantity is less than a fourth threshold; and determine the picture block that is marked with the specific marker and that is in the current video frame as the small-object region in the current video frame; where the third set range is smaller than the first set range and the second set range, and the fourth threshold is less than the third threshold.

According to a fifth aspect, an apparatus for interpolating a frame between two adjacent video frames is provided, including a determining unit configured to determine a small-object region in a former video frame and a small-object region in a latter video frame, where the former video frame and the latter video frame are two consecutively adjacent video frames; and transmit information about the determined small-object region in the former video frame and information about the determined small-object region in the latter video frame to a filtering unit; the filtering unit configured to determine, according to the information that is about the small-object region in the former video frame and that is from the determining unit and the information about the small-object region in the latter video frame and that is from the determining unit, the small-object region in the former video frame and the small-object region in the latter video frame, perform smooth filtering on an interframe motion vector corresponding to a region except the small-object region in the former video frame and the small-object region in the latter video frame, and transmit an interframe motion vector obtained after the smooth filtering to an interpolation unit; and the interpolation unit configured to interpolate a frame between the two consecutively adjacent video frames according to the interframe motion vector that is obtained after the smooth filtering and that is from the filtering unit, an interframe motion vector corresponding to the small-object region in the former video frame, and an interframe motion vector corresponding to the small-object region in the latter video frame.

According to a sixth aspect, an apparatus for interpolating a frame between two adjacent video frames is provided, including a classification unit configured to classify, according to a to-be-processed picture block included in a small-object region in preceding N video frames of two consecutively adjacent video frames, to-be-processed picture blocks included in each video frame of the two consecutively adjacent video frames into a first-type to-be-processed picture block and a second-type to-be-processed picture block, and transmit classification information corresponding to the first-type to-be-processed picture block and the second-type to-be-processed picture block to a processing unit; the processing unit configured to determine, according to the classification information from the classification unit, the first-type to-be-processed picture block and the second-type to-be-processed picture block that are in the to-be-processed picture blocks included in each video frame in the two consecutively adjacent video frames; separately determine an interframe motion vector of each first-type to-be-processed picture block and an interframe motion vector of each second-type to-be-processed picture block, and use the determined interframe motion vector of each first-type to-be-processed picture block included in each video frame of the two consecutively adjacent video frames and the determined interframe motion vector of each second-type to-be-processed picture block included in each video frame of the two consecutively adjacent video frames as an interframe motion vector between the two consecutively adjacent video frames; and transmit the interframe motion vector between the two consecutively adjacent video frames to an interpolation unit; and the interpolation unit configured to interpolate a frame between the two consecutively adjacent video frames according to the interframe motion vector that is of the two consecutively adjacent video frames and that is from the processing unit, where N is a positive integer.

With reference to the sixth aspect, in a first possible implementation manner, the classification unit is configured to execute the following for the to-be-processed picture block included in each video frame of the two consecutively adjacent video frames: selecting at least one video frame from the preceding N video frames of the two consecutively adjacent video frames; determining, according to the small-object region in the preceding N video frames of the two consecutively adjacent video frames, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

With reference to the first possible implementation manner of the sixth aspect, in a second possible implementation manner, the processing unit is configured to determine a value of a dissimilarity between each candidate motion vector corresponding to the first-type to-be-processed picture block and a background motion vector of a video frame in which the first-type to-be-processed picture block is located; assign a corresponding weight to each candidate motion vector according to the determined value of the dissimilarity corresponding to each candidate motion vector by using a rule that a smaller weight is assigned to a larger value of the dissimilarity; and determine the interframe motion vector of the first-type to-be-processed picture block according to the weight assigned to each candidate motion vector and a SAD value of pixels of a picture block pointed to by each candidate motion vector and pixels of the first-type to-be-processed picture block.

With reference to the first possible implementation manner or the second possible implementation manner of the sixth aspect, in a third possible implementation manner, the classification unit is configured to select at least one preceding continuous video frame of the two consecutively adjacent video frames.

With reference to the second possible implementation manner or the third possible implementation manner of the sixth aspect, in a fourth possible implementation manner, the processing unit is configured to, for each candidate motion vector, determine a product of the weight assigned to the candidate motion vector and the SAD value of the pixels of the picture block pointed to by the candidate motion vector and the pixels of the first-type to-be-processed picture block, and use a candidate motion vector with a smallest product as the interframe motion vector of the first-type to-be-processed picture block.

According to the method for determining a small-object region in a video frame provided in the first aspect and the apparatus for determining a small-object region in a video frame provided in the fourth aspect, a candidate small-object region in the video frame is determined according to an interframe motion vector of the video frame and a global motion vector, and filtering is performed on the candidate small-object region in the video frame to obtain the small-object region in the video frame, thereby achieving an effect of determining, in the video frame, the small-object region included in the video frame relatively accurately.

According to the method for interpolating a frame between two adjacent video frames provided in the second aspect and the apparatus for interpolating a frame between two adjacent video frames provided in the fifth aspect, smooth filtering is performed only on an interframe motion vector corresponding to a region except a small-object region in each video frame in the two adjacent video frames, and a frame is interpolated between two consecutively adjacent video frames according to an interframe motion vector of the small-object region in each video frame in the two adjacent video frames and an interframe motion vector obtained after the smooth filtering, so that a problem in the prior art that an interframe motion vector of a small-object region in two consecutively adjacent video frames is replaced by a background motion vector of the frames because overall filtering is performed on an interframe motion vector between the two adjacent video frames is avoided, thereby improving playback quality of a high-definition video or an ultra-high-definition video.

According to the method for interpolating a frame between two adjacent video frames provided in the third aspect and the apparatus for interpolating a frame between two adjacent video frames provided in the sixth aspect, smooth filtering is not performed on an interframe motion vector between two consecutively adjacent video frames, but a frame is interpolated between the two adjacent video frames directly according to an obtained interframe motion vector between the two adjacent video frames, so that absence of pixels of the small-object in the generated interpolated frame is avoided, thereby improving playback quality of a high-definition video or an ultra-high-definition video.

DETAILED DESCRIPTION

Figure 1:
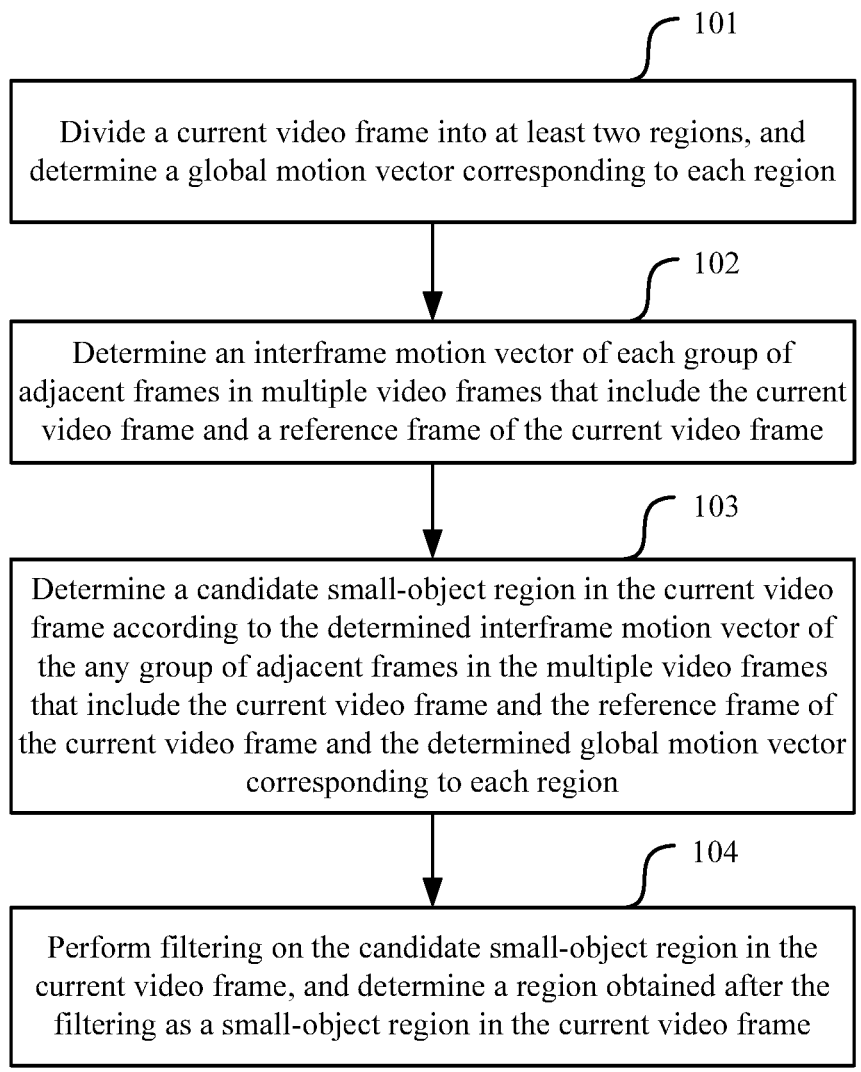
FIG. 1 is a schematic flowchart of a method for determining a small-object region in a video frame according to an embodiment of the present disclosure.

In embodiments of the present disclosure, a current video frame is divided into at least two regions, and a global motion vector corresponding to each region is determined; an interframe motion vector of each group of adjacent frames in multiple video frames that include the current video frame and a reference frame of the current video frame is determined; a candidate small-object region in the current video frame is determined according to the determined interframe motion vector of the each group of adjacent frames in the multiple video frames that include the current video frame and the reference frame of the current video frame and the determined global motion vector corresponding to each region; and filtering is performed on the candidate small-object region in the current video frame, and a region obtained after the filtering is determined as a small-object region in the current video frame, where the reference frame of the current video frame includes one or more of preceding continuous video frames of the current video frame and following continuous video frames of the current video frame. A candidate small-object region in a video frame is determined according to an interframe motion vector of video frames and a global motion vector, and filtering is performed on the candidate small-object region in the video frame to obtain a small-object region in the video frame, thereby achieving an effect of determining, in the video frame, the small-object region included in the video frame relatively accurately.

In the embodiments of the present disclosure, a small-object region in a former video frame and a small-object region in a latter video frame are determined, where the former video frame and the latter video frame are two consecutively adjacent video frames; smooth filtering is performed on an interframe motion vector corresponding to a region except the small-object region in the former video frame and the small-object region in the latter video frame; and a frame is interpolated between the two consecutively adjacent video frames according to an interframe motion vector corresponding to the small-object region in the former video frame, an interframe motion vector corresponding to the small-object region in the latter video frame, and an interframe motion vector obtained after the smooth filtering. Smooth filtering is performed only on an interframe motion vector corresponding to a region except a small-object region in each of two adjacent video frames, so that a problem that an interframe motion vector of a small-object region in a video frame in two consecutively adjacent video frames is replaced by a background motion vector of this frame is eliminated, thereby improving playback quality of a high-definition video or an ultra-high-definition video.

In the embodiments of the present disclosure, according to a to-be-processed picture block included in a small-object region in preceding N video frames of two consecutively adjacent video frames, to-be-processed picture blocks included in each video frame of the two consecutively adjacent video frames is classified into a first-type to-be-processed picture block and a second-type to-be-processed picture block; an interframe motion vector of each first-type to-be-processed picture block and an interframe motion vector of each second-type to-be-processed picture block are separately determined, and the determined interframe motion vector of each first-type to-be-processed picture block included in each video frame of the two consecutively adjacent video frames and the determined interframe motion vector of each second-type to-be-processed picture block included in each video frame of the two consecutively adjacent video frames are used as an interframe motion vector between the two consecutively adjacent video frames; and a frame is interpolated between the two consecutively adjacent video frames according to the obtained interframe motion vector between the two consecutively adjacent video frames. Smooth filtering is not performed on an interframe motion vector between two consecutively adjacent video frames, and a frame is interpolated between the two adjacent video frames directly according to an obtained interframe motion vector between the two adjacent video frames, so that absence of pixels of the small-object in the generated interpolated frame is avoided, thereby improving playback quality of a high-definition video or an ultra-high-definition video.

It should be noted that, in the embodiments of the present disclosure, a video frame except an interpolated frame is a received original frame.

The following further describes the embodiments of the present disclosure in detail with reference to the accompanying drawings of the specification.

It should be noted that the embodiments of the present disclosure may be performed by any apparatus or system capable of playing a video.

As shown in FIG. 1, a method for determining a small-object region in a video frame according to an embodiment of the present disclosure includes the following steps.

Step 101: Divide a current video frame into at least two regions, and determine a global motion vector corresponding to each region.

Step 102: Determine an interframe motion vector of each group of adjacent frames in multiple video frames that include the current video frame and a reference frame of the current video frame.

Step 103: Determine a candidate small-object region in the current video frame according to the determined interframe motion vector of the each group of adjacent frames in the multiple video frames that include the current video frame and the reference frame of the current video frame and the determined global motion vector corresponding to each region.

Step 104: Perform filtering on the candidate small-object region in the current video frame, and determine a region obtained after the filtering as a small-object region in the current video frame.

The reference frame of the current video frame includes one or more of preceding continuous video frames of the current video frame and following continuous video frames of the current video frame.

Preferably, in step 101, how many regions into which the current video frame is divided may be set as needed or empirically, for example, the current video frame is empirically divided into four regions.

During specific implementation, any method for determining a global motion vector in the prior art may be used to determine the global motion vector corresponding to each region in this embodiment of the present disclosure.

During implementation, when a proportion of a background in a video frame to the video frame is relatively large and the video frame is divided into a relatively small quantity of regions, a global motion vector corresponding to each region of the video frame approximately equals a background motion vector corresponding to this region, and the global motion vector corresponding to each region of the video frame may be used to represent the background motion vector corresponding to this region of the video frame.

Preferably, in step 102, a quantity of reference frames of the current video frame may be set as needed or empirically.

Figure 2:
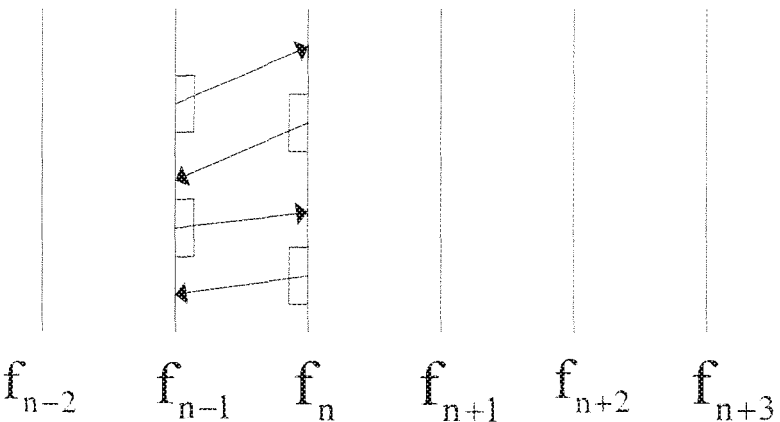
FIG. 2 is a schematic diagram of an interframe motion vector according to an embodiment of the present disclosure.

For example, as shown in FIG. 2, received original frames include a video frame $f_{n-2}$, a video frame $f_{n-1}$, a video frame $f_n$, a video frame $f_{n+1}$, a video frame $f_{n+2}$, and a video frame $f_{n+3}$, and it is assumed that the current video frame is $f_n$.

$f_{n-1}$, $f_{n+1}$, and $f_{n+2}$ may be set as reference frames of $f_n$; $f_{n+1}$ may be set as a reference frame of $f_n$; or $f_{n-1}$ may be set as a reference frame of $f_n$.

During specific implementation, in step 102, for the multiple video frames that include the current video frame and the reference frame of the current video frame, when a small-object region in a video frame before the current video frame is determined, an interframe motion vector of each group of adjacent frames in some video frames of the multiple video frames has already determined.

For example, as shown in FIG. 2, received original frames include a video frame $f_{n-2}$, a video frame $f_{n-1}$, a video frame $f_n$, a video frame $f_{n+1}$, a video frame $f_{n+2}$, and a video frame $f_{n+3}$, and it is assumed that the current video frame is $f_n$.

When a small-object region in $f_{n-1}$ is determined, reference frames of $f_{n-1}$ are $f_{n-2}$, $f_n$, and $f_{n+1}$, and an interframe motion vector between $f_{n-1}$ and $f_n$ and an interframe motion vector between $f_n$ and $f_{n+1}$ need to be determined.

When a small-object region in $f_n$ is determined, reference frames of $f_n$ are $f_{n-1}$, $f_{n+1}$, and $f_{n+2}$, and an interframe motion vector between $f_{n-1}$ and $f_n$, an interframe motion vector between $f_n$ and $f_{n+1}$, and an interframe motion vector between $f_{n+1}$ and $f_{n+2}$ need to be determined; however, the interframe motion vector between $f_{n-1}$ and $f_n$ and the interframe motion vector between $f_n$ and $f_{n+1}$ are determined interframe motion vectors.

During specific implementation, in step 102, in a case where an interframe motion vector of a group of adjacent frames in the multiple video frames that include the current video frame and the reference frame of the current video frame is known (that is, a determined interframe motion vector), the known interframe motion vector may be used as an interframe motion vector that is of the group of adjacent frames and that needs to be determined when the small-object region in the current video frame is determined.

For example, as shown in FIG. 2, received original frames include a video frame $f_{n-2}$, a video frame $f_{n-1}$, a video frame $f_n$, a video frame $f_{n+1}$, a video frame $f_{n+2}$, and a video frame $f_{n+3}$, and it is assumed that the current video frame is $f_n$.

When a small-object region in $f_{n-1}$ is determined, reference frames of $f_{n-1}$ are $f_{n-2}$, $f_n$, and $f_{n+1}$, and an interframe motion vector between $f_{n-1}$ and $f_n$ and an interframe motion vector between $f_n$ and $f_{n+1}$ are determined.

When a small-object region in $f_n$ is determined, reference frames of $f_n$ is $f_{n-1}$, $f_{n+1}$, and $f_{n+2}$, and an interframe motion vector between $f_{n-1}$ and $f_n$ and an interframe motion vector between $f_n$ and $f_{n+1}$ are known, the interframe motion vector that is between $f_{n-1}$ and $f_n$ and that is determined when the small-object region in $f_{n-1}$ is determined may be used as the interframe motion vector that is between $f_{n-1}$ and $f_n$ and that needs to be determined when the small-object region in $f_n$ is determined, and the interframe motion vector that is between $f_n$ and $f_{n+1}$ and that is determined when the small-object region in $f_{n-1}$ is determined may be used as the interframe motion vector that is between $f_n$ and $f_{n+1}$ and that needs to be determined when the small-object region in $f_n$ is determined.

During implementation, in a case in which an interframe motion vector of a group of adjacent frames in the multiple video frames that include the current video frame and the reference frame of the current video frame is known, the known interframe motion vector is used as an interframe motion vector that is of the group of adjacent frames and that needs to be determined when the small-object region in the current video frame is determined, so that complexity of determining the small-object region in the current video frame can be reduced.

Preferably, in step 102, the determining an interframe motion vector of each group of adjacent frames in multiple video frames that include the current video frame and a reference frame of the current video frame includes performing motion estimation on the multiple video frames that include the current video frame and the reference frame of the current video frame, and determining the interframe motion vector of the each group of adjacent frames in the multiple video frames that include the current video frame and the reference frame of the current video frame.

During specific implementation, any method for performing motion estimation on a video frame in the prior art may be used to perform the motion estimation on a video frame in this embodiment of the present disclosure.

During implementation, if motion estimation is performed on a video frame corresponding to a known interframe motion vector, a newly obtained interframe motion vector of the video frame has relatively higher accuracy.

During specific implementation, the interframe motion vector of the each group of adjacent frames in the multiple video frames that include the current video frame and the reference frame of the current video frame is an interframe motion vector of a to-be-processed picture block included in each video frame of the each group of adjacent frames, where the performing motion estimation on the multiple video frames that include the current video frame and the reference frame of the current video frame is performing the motion estimation on the to-be-processed picture block included in each video frame in the each group of adjacent frames in the multiple video frames. During specific implementation, to-be-processed picture blocks included in each video frame in the each group of adjacent frames in the multiple video frames that include the current video frame and the reference frame of the current video frame may be classified according to the determined small-object region in the video frame before the current video frame, and for to-be-processed picture blocks of different types, different methods are used to perform the motion estimation on the to-be-processed picture blocks, so as to determine interframe motion vectors of the to-be-processed picture blocks.

Preferably, before the determining an interframe motion vector of each group of adjacent frames in multiple video frames that include the current video frame and a reference frame of the current video frame, the method further includes, for the to-be-processed picture block included in each video frame in the each group of adjacent frames in the multiple video frames that include the current video frame and the reference frame of the current video frame, executing the following: selecting at least one video frame from preceding N video frames of the current video frame, where N is a positive integer; determining, according to a small-object region determined in the preceding N video frames of the current video frame, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

Preferably, in step 102, the determining an interframe motion vector of each group of adjacent frames in multiple video frames that include the current video frame and a reference frame of the current video frame includes separately determining an interframe motion vector of each first-type to-be-processed picture block and an interframe motion vector of each second-type to-be-processed picture block; and using the determined interframe motion vector of each first-type to-be-processed picture block included in each video frame in the each group of adjacent frames and the determined interframe motion vector of each second-type to-be-processed picture block included in each video frame in the each group of adjacent frames as the interframe motion vector of the each group of adjacent frames.

During specific implementation, the at least one video frame may be selected from the preceding N video frames of the current video frame as needed or empirically.

For example, as shown in FIG. 2, the current video frame is $f_n$, $f_{n-3}$ and $f_{n-1}$ may be used as selected video frames as needed, or $f_{n-1}$ may be empirically used as a selected video frame.

Preferably, the selecting at least one video frame from preceding N video frames of the current video frame includes selecting at least one preceding continuous video frame of the current video frame.

Preferably, determining a reference picture block that is in a selected video frame and that is corresponding to the to-be-processed picture block includes determining a location of the to-be-processed picture block in a video frame that includes the to-be-processed picture block; and using a picture block in a corresponding location in the selected video frame as the reference picture block that is in the selected video frame and that is corresponding to the to-be-processed picture block.

During implementation, the to-be-processed picture blocks included in each video frame in the each group of adjacent frames in the multiple video frames are classified according to the small-object region determined in the preceding N video frames of the current video frame, and for to-be-processed picture blocks of different types, different methods are used to perform the motion estimation on the to-be-processed picture blocks, so as to determine interframe motion vectors of the to-be-processed picture blocks, thereby reducing difficulty of performing the motion estimation on the current video frame and the reference frame of the current video frame, and improving precision of an interframe motion vector obtained by means of motion estimation.

During specific implementation, N may be set as needed or empirically, for example, N may be set to 1 or 2.

Preferably, the determining an interframe motion vector of each first-type to-be-processed picture block includes the following steps.

Step A1: Determine a value of a dissimilarity between each candidate motion vector corresponding to the first-type to-be-processed picture block and a background motion vector of a video frame in which the first-type to-be-processed picture block is located.

Step A2: Assign a corresponding weight to each candidate motion vector according to the determined value of the dissimilarity corresponding to each candidate motion vector by using a rule that a smaller weight is assigned to a larger value of the dissimilarity.

Step A3: Determine the interframe motion vector of the first-type to-be-processed picture block according to the weight assigned to each candidate motion vector and a SAD value of pixels of a picture block pointed to by each candidate motion vector and pixels of the first-type to-be-processed picture block.

It should be noted that, the interframe motion vector of the to-be-processed picture block included in each video frame in the each group of adjacent frames is directional, that is, an interframe motion vector of a to-be-processed picture block included in a former video frame in the each group of adjacent frames is a forward motion vector between the each group of adjacent frames, and an interframe motion vector of a to-be-processed picture block included in a latter video frame in the each group of adjacent frames is a backward motion vector between the each group of adjacent frames.

For example, as shown in FIG. 2, a group of adjacent frames are $f_{n-1}$ and $f_n$, interframe motion vectors of $f_{n-1}$ and $f_n$ are an interframe motion vector of a to-be-processed picture block included in $f_{n-1}$ and an interframe motion vector of a to-be-processed picture block included in $f_n$, and the interframe motion vector of the to-be-processed picture block included in $f_{n-1}$ is a forward motion vector between $f_{n-1}$ and $f_n$, and the interframe motion vector of the to-be-processed picture block included in $f_n$ is a backward motion vector between $f_{n-1}$ and $f_n$.

Preferably, an implementation manner for determining each candidate motion vector corresponding to the first-type to-be-processed picture block in step A1 is similar to an implementation manner for determining each candidate motion vector corresponding to a to-be-processed picture block in the prior art, for example, a time-domain candidate motion vector or a space-domain candidate motion vector corresponding to the to-be-processed picture block is determined.

Preferably, in step A1, the value of the dissimilarity between each candidate motion vector corresponding to the first-type to-be-processed picture block and the background motion vector of the video frame in which the first-type to-be-processed picture block is located is a value used to represent a dissimilarity between each candidate motion vector and the background motion vector.

During specific implementation, any value of dissimilarity that can represent a dissimilarity between each candidate motion vector and the background motion vector is applicable to the present disclosure, such as an absolute value of a difference between each candidate motion vector and the background motion vector, a difference between an absolute value of each candidate motion vector and an absolute value of the background motion vector, a sum of differences between each candidate motion vector and the background motion vector in different dimensions (for example, a dimension X and a dimension Y), or a square root value of a sum of squares of differences between each candidate motion vector and the background motion vector in different dimensions.

During specific implementation, an implementation manner for determining the background motion vector of the video frame is similar to an implementation manner for determining a background motion vector of a video frame in the prior art, and details are not repeatedly described herein.

Preferably, in step A3, an implementation manner for determining the SAD value of the pixels of the picture block pointed to by each candidate motion vector and the pixels of the first-type to-be-processed picture block is similar to an implementation manner for determining a SAD value of pixels of a picture block pointed to by a candidate motion vector and pixels of a to-be-processed picture block in the prior art.

For example, for a candidate motion vector, a picture block pointed to by the candidate motion vector is determined, an absolute value of a difference between each pixel included in the picture block pointed to by the candidate motion vector and a corresponding pixel included in the first-type to-be-processed picture block is determined, a sum of the absolute values of the differences between the pixels is determined, the sum of the absolute values of differences is divided by a quantity of pixels in the picture block, and then a value obtained by dividing the sum of the absolute values of the differences by the quantity of pixels in the picture block is used as the SAD value of the pixels of the picture block pointed to by the candidate motion vector and the pixels of the first-type to-be-processed picture block.

Preferably, in step A3, the determining the interframe motion vector of the first-type to-be-processed picture block includes, for each candidate motion vector, determining a product of the weight assigned to the candidate motion vector and the SAD value of the pixels of the picture block pointed to by the candidate motion vector and the pixels of the first-type to-be-processed picture block, and using a candidate motion vector with a smallest product as the interframe motion vector of the first-type to-be-processed picture block.

It should be noted that, there are multiple implementation manners for determining the interframe motion vector of the first-type to-be-processed picture block according to the weight corresponding to each candidate motion vector of the first-type to-be-processed picture block and the SAD value of the pixels of the picture block pointed to by the candidate motion vector and pixels of the first-type to-be-processed picture block, for example, for each candidate motion vector corresponding to the first-type to-be-processed picture block, a sum of the weight assigned to the candidate motion vector and the SAD value of the pixels of the picture block pointed to by the candidate motion vector and pixels of the first-type to-be-processed picture block is determined, and a candidate motion vector with a smallest sum is used as the interframe motion vector of the first-type to-be-processed picture block. Implementation manners enumerated in this embodiment of the present disclosure are merely exemplary implementation manners.

Preferably, an implementation manner for determining the interframe motion vector of each second-type to-be-processed picture block is similar to an implementation manner for determining an interframe motion vector of a to-be-processed picture block in the prior art, for example, a candidate motion vector is randomly selected from multiple candidate motion vectors corresponding to the second-type to-be-processed picture block and is used as the interframe motion vector of the second-type to-be-processed picture block.

Preferably, in step 103, the determining a candidate small-object region in the current video frame includes the following steps.

Step B1: Determine, in each reference frame of the current video frame and according to the interframe motion vector of the each group of adjacent frames in the multiple video frames that include the current video frame and the reference frame of the current video frame, a matching block corresponding to each picture block included in the current video frame.

During specific implementation, for each picture block included in the current video frame, implementation manners for determining matching blocks corresponding to the picture blocks are similar, and the following are detailed descriptions about an implementation manner for determining a matching block corresponding to a picture block included in the current video frame.

Figure 3:
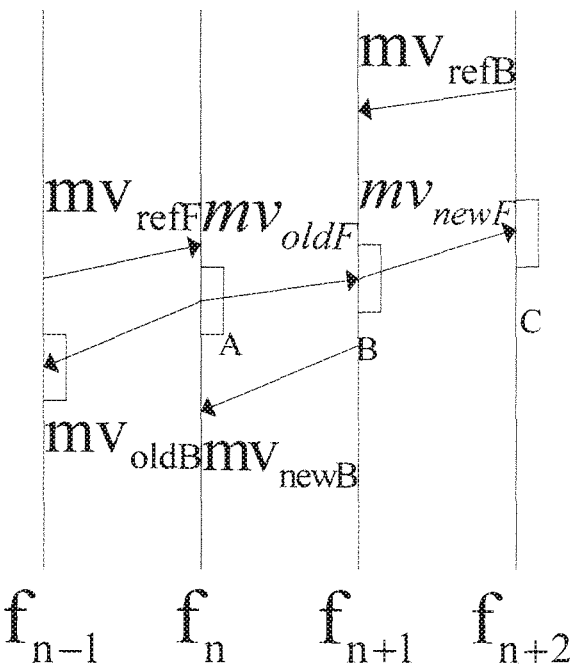
FIG. 3 is a schematic diagram of a reference frame according to an embodiment of the present disclosure.

As shown in FIG. 3, received original frames include a video frame $f_{n-1}$, a video frame $f_n$, a video frame $f_{n+1}$, and a video frame $f_{n+2}$, the current video frame is $f_n$, $f_n$ includes a picture block A, and reference frames of $f_n$ are $f_{n+1}$ and $f_{n+2}$.

For the reference frame $f_{n+1}$ of $f_n$, a matching block B that is in $f_{n+1}$ and that is of the picture block A is determined according to an interframe motion vector $mv_{oldF}$ (an interframe motion vector between $f_n$ and $f_{n+1}$) of the picture block A.

For the reference frame $f_{n+2}$ of $f_n$, a matching block B that is in $f_{n+1}$ and that is of the picture block A is determined according to the interframe motion vector $mv_{oldF}$ (an interframe motion vector between $f_n$ and $f_{n+1}$) of the picture block A, and a matching block C that is in $f_{n+2}$ and that is of the picture block A is determined according to an interframe motion vector $mv_{newF}$ (an interframe motion vector between $f_{n+1}$ and $f_{n+2}$) of the matching block B.

Preferably, in step B1, when reference frames of the current video frame are different, interframe motion vectors of picture blocks included in the current video frame may be different or may be the same.

For example, as shown in FIG. 3, received original frames include a video frame $f_{n-1}$, a video frame $f_n$, a video frame $f_{n+1}$, and a video frame $f_{n+2}$, the current video frame is $f_n$, and reference frames of $f_n$ are $f_{n-1}$, $f_{n+1}$, and $f_{n+2}$.

For the reference frame $f_{n-1}$ of $f_n$, an interframe motion vector of each picture block in $f_n$ is a backward motion vector that is of the picture block in $f_n$ and that is between $f_{n+1}$ and $f_n$.

For the reference frame $f_{n+1}$ of $f_n$, an interframe motion vector of each picture block in $f_n$ is a forward motion vector that is of the picture block in $f_n$ and that is between $f_n$ and $f_{n+1}$.

For the reference frame $f_{n+2}$ of $f_n$, an interframe motion vector of each picture block in $f_n$ is a forward motion vector that is of the picture block in $f_n$ and that is between $f_n$ and $f_{n+2}$.

Step B2: Determine, in each reference frame, a nearby block near the matching block, and determine an interframe motion vector of each nearby block determined in each reference frame.

Preferably, the nearby block near the matching block is a picture block located within a specific range around the matching block.

During specific implementation, the specific range may be determined as needed or empirically.

Step B3: For each picture block included in the current video frame, determine a value of a similarity between the interframe motion vector of each nearby block determined for the picture block and an interframe motion vector of the picture block, and determine a value of a dissimilarity between the interframe motion vector and a global motion vector that are of each nearby block.

Preferably, for a nearby block determined for the picture block, the determining a value of a similarity between the interframe motion vector of the nearby block and an interframe motion vector of the picture block includes, when the interframe motion vector of the nearby block and the interframe motion vector of the picture block are forward motion vectors, determining the value of the similarity between the interframe motion vector of the nearby block and the interframe motion vector of the picture block according to a difference between the interframe motion vector of the nearby block and the interframe motion vector of the picture block; when the interframe motion vector of the nearby block and the interframe motion vector of the picture block are backward motion vectors, determining the value of the similarity between the interframe motion vector of the nearby block and the interframe motion vector of the picture block according to a difference between the interframe motion vector of the nearby block and the interframe motion vector of the picture block; when the interframe motion vector of the nearby block is a backward motion vector and the interframe motion vector of the picture block is a forward motion vector, determining the value of the similarity between the interframe motion vector of the nearby block and the interframe motion vector of the picture block according to a sum of the interframe motion vector of the nearby block and the interframe motion vector of the picture block; or when the interframe motion vector of the nearby block is a forward motion vector and the interframe motion vector of the picture block is a backward motion vector, determining the value of the similarity between the interframe motion vector of the nearby block and the interframe motion vector of the picture block according to a sum of the interframe motion vector of the nearby block and the interframe motion vector of the picture block.

During implementation, a smaller sum/difference in the foregoing indicates a larger value of the similarity between the interframe motion vector of the nearby block and the interframe motion vector of the picture block.

Preferably, for a nearby block determined for the picture block, the determining a value of a dissimilarity between the interframe motion vector and a global motion vector that are of the nearby block includes determining the global motion vector of the nearby block according to a region in at least two regions corresponding to the nearby block; and determining the value of the dissimilarity between the interframe motion vector of the nearby block and the global motion vector of the nearby block according to a difference between the interframe motion vector of the nearby block and the global motion vector of the nearby block.

During specific implementation, the region in the at least two regions corresponding to the nearby block may be determined according to a region that is in the current video frame and in which the matching block, of the nearby block, in the current video frame is located; or the region in the at least two regions corresponding to the nearby block may be determined according to a region that is in a reference frame including the nearby block and in which the nearby block is located, which may be set as needed.

During implementation, a larger difference between the interframe motion vector of the nearby block and the global motion vector of the nearby block indicates a larger value of a dissimilarity between the interframe motion vector of the nearby block and the global motion vector of the nearby block and a larger value of a dissimilarity between the interframe motion vector of the nearby block and a background motion vector of the reference frame including the nearby block.

Step B4: Determine, according to the determined value of the similarity and the determined value of the dissimilarity, a picture block included in the candidate small-object region in the current video frame, where each picture block included in the candidate small-object region meets the following: in multiple nearby blocks that are determined for the picture block and that are in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

Preferably, in step B4, the first set quantity, the second set quantity, the first threshold, and the second threshold may be set as needed or empirically, for example, when each picture block includes 8 pixels*8 pixels, the first set quantity may be 10, the second set quantity is 10, the first threshold is 16, and the second threshold is 16.

During specific implementation, the candidate small-object region in the current video frame is an object region that is different from a background in the current video frame.

Preferably, before step 104, a specific marker may be further marked on each picture block included in the candidate small-object region.

Preferably, the specific marker may be set as needed or empirically, and may be set as a letter, a number, or a symbol, for example, the specific marker may be set to 1 or 0.

Preferably, after the specific marker is marked on each picture block included in the candidate small-object region, the following is further included: saving the picture block marked with the specific marker.

Preferably, in step 104, the performing filtering on the candidate small-object region in the current video frame, and determining a region obtained after the filtering as a small-object region in the current video frame includes the following steps.

Step C1: For each picture block included in the candidate small-object region in the current video frame, determine a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block.

Step C2: Remove the specific marker of the picture block when the determined value of the first quantity or the determined value of the second quantity is greater than a third threshold.

Step C3: Determine a value of a third quantity of picture blocks that are marked with the specific marker and that are in a third set range around the picture block.

Step C4: Remove the specific marker of the picture block when the determined value of the third quantity is less than a fourth threshold.

Step C5: Determine the picture block that is marked with the specific marker and that is in the current video frame as the small-object region in the current video frame.

The third set range is smaller than the first set range and the second set range, and the fourth threshold is less than the third threshold.

Preferably, in step C1, the first set range and the second set range may be set as needed or empirically, where the first set range may be larger than the second set range, the first set range may be smaller than the second set range, or the first set range may be equal to the second set range.

During specific implementation, in step C2, the third threshold may be set as needed or empirically.

Preferably, the third threshold may be determined according to a definition of the small-object region, for example, when a proportion of the small-object region to the background of the current video frame is less than a specific value, the third threshold may be determined according to the specific value.

Figure 4:
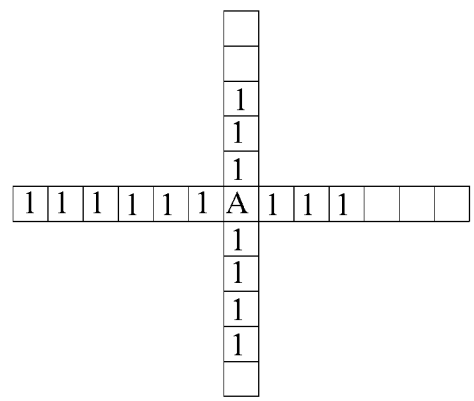
FIG. 4 is a schematic diagram of object filtering according to an embodiment of the present disclosure.

For example, assuming that the specific marker of each picture block included in the candidate small-object region in the current video frame is 1 and the third threshold is 6, as shown in FIG. 4, for a picture block A marked with 1, the first set range includes 13 unit blocks that take the picture block A as a center, the second set range includes 11 unit blocks that take the picture block A as a center, and it is determined that a value of a first quantity of picture blocks that are marked with the specific marker and that are in the first set range in a horizontal direction of the picture block A is 10 and a value of a second quantity of picture blocks that are marked with the specific marker and that are in the second set range in a vertical direction of the picture block A is 8. Because both the value of the first quantity and the value of the second quantity are greater than the third threshold, the specific marker of the picture block A is removed.

During implementation, a region corresponding to an object except a small-object in the candidate small-object region included in the current video frame is filtered out by executing step C1 and step C2.

Preferably, in step C3, the third set range may be set as needed or empirically.

Preferably, in step C4, the fourth threshold may be set as needed or empirically.

Figure 5:
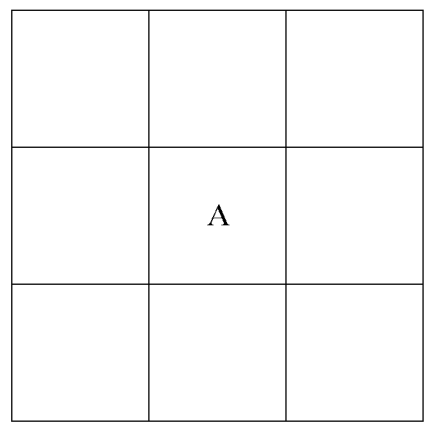
FIG. 5 is a schematic diagram of noise filtering according to an embodiment of the present disclosure.

For example, assuming that the specific marker of each picture block included in the candidate small-object region in the current video frame is 1 and the fourth threshold is 2, as shown in FIG. 5, for a picture block A marked with 1, the third set range includes 8 unit blocks around the picture block A, and it is determined that a value of a third quantity of picture blocks that are in the third set range around the picture block and that are marked with the specific marker is 0. Because the value of the third quantity is less than the fourth threshold, the specific marker of the picture block A is removed.

During implementation, a region corresponding to a noise in the candidate small-object region included in the current video frame is filtered out by executing step C3 and step C4.

During specific implementation, step C1 may be executed before step C3; step C3 may be executed before step C1; or step C1 and step C3 may be executed at a same time.

With reference to FIG. 3 and an example in which reference frames of a video frame $f_n$ are $f_{n-1}$, $f_{n+1}$, and $f_{n+2}$ is used, the following describes in detail a method for determining a small-object region in the video frame $f_n$ according to an embodiment of the present disclosure.

Figure 6A:
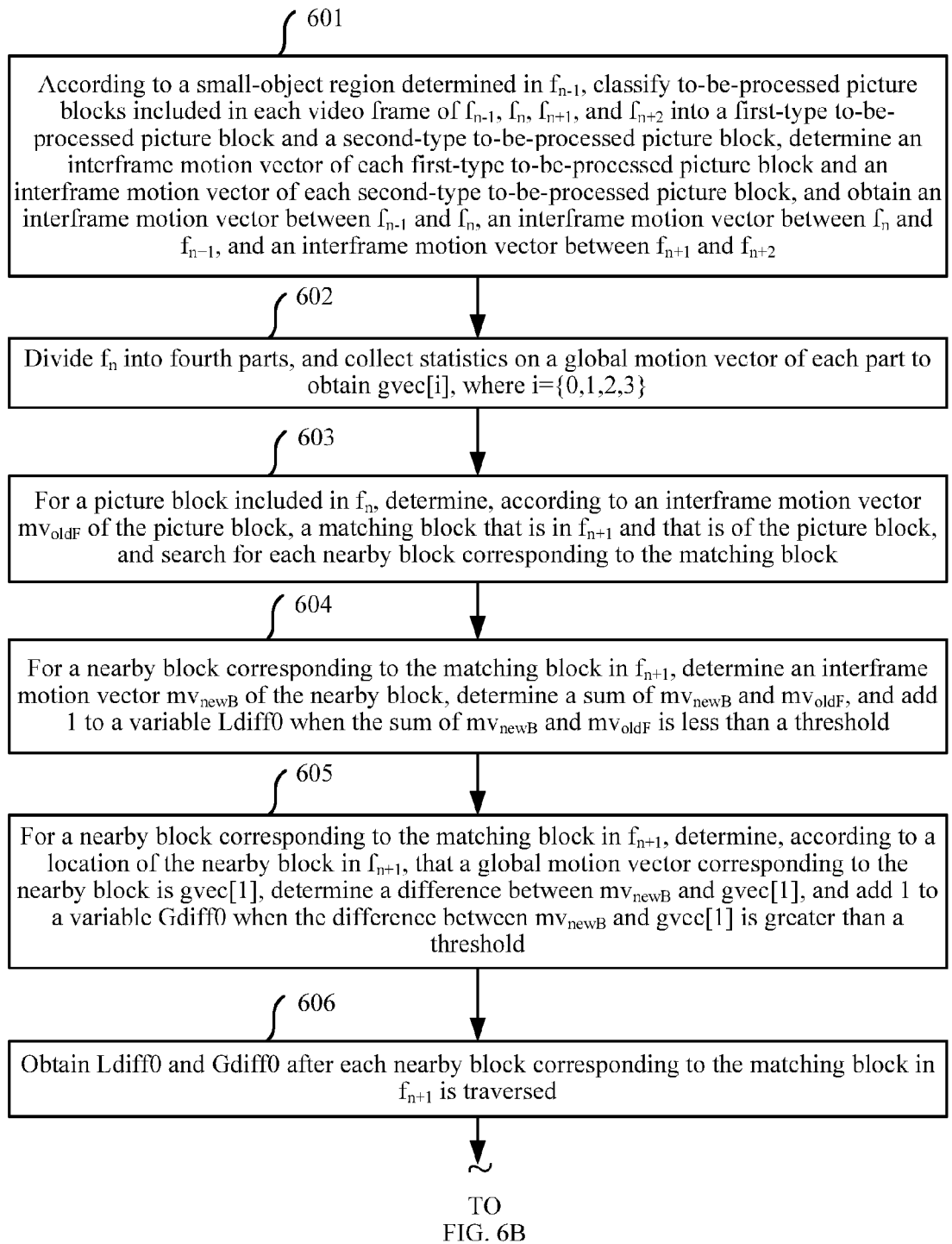
FIG. 6A, FIG. 6B, and FIG. 6C are schematic flowcharts of a detailed method for determining a small-object region in a video frame according to an embodiment of the present disclosure.
Figure 6B:
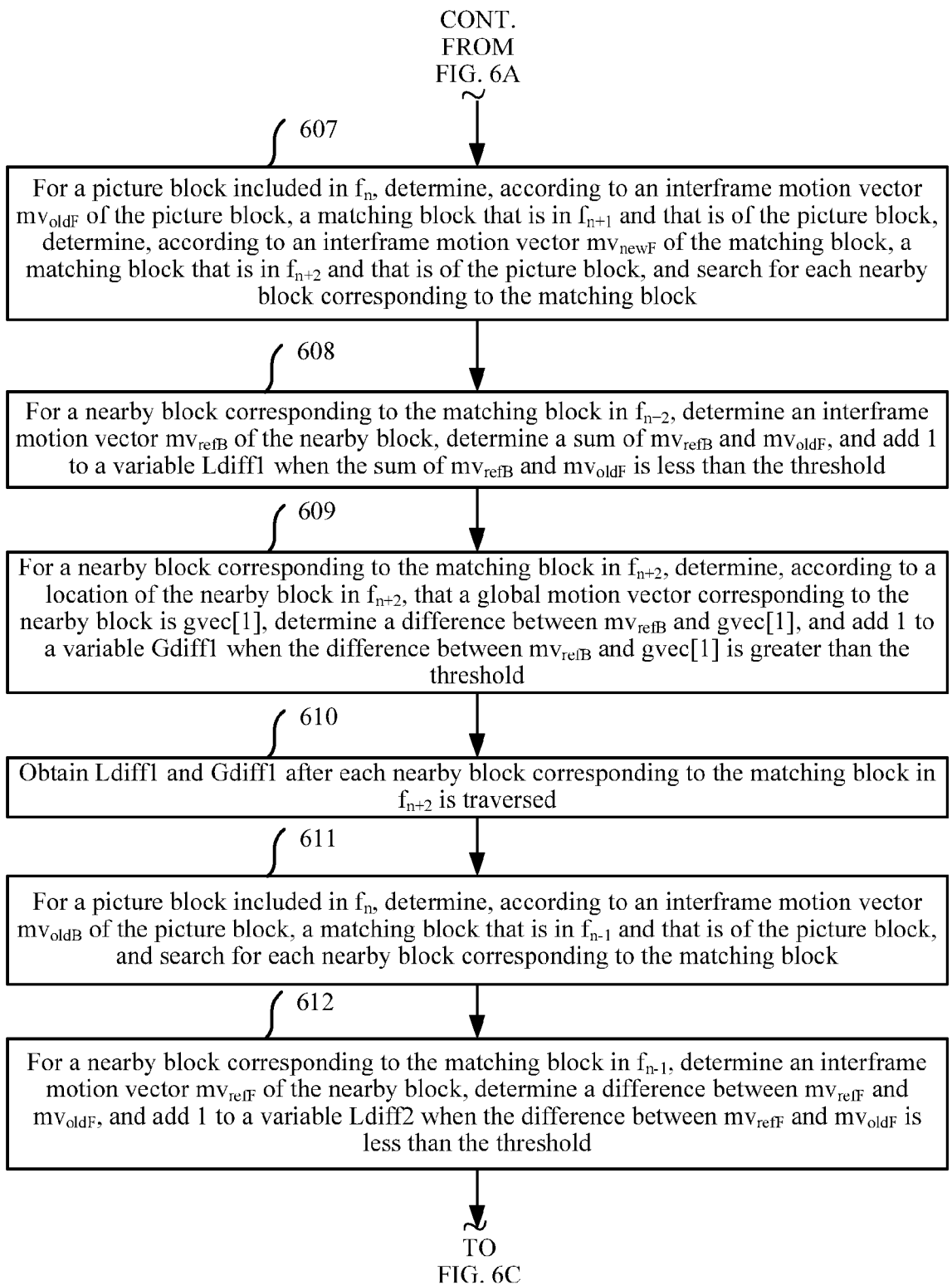
Figure 6C:
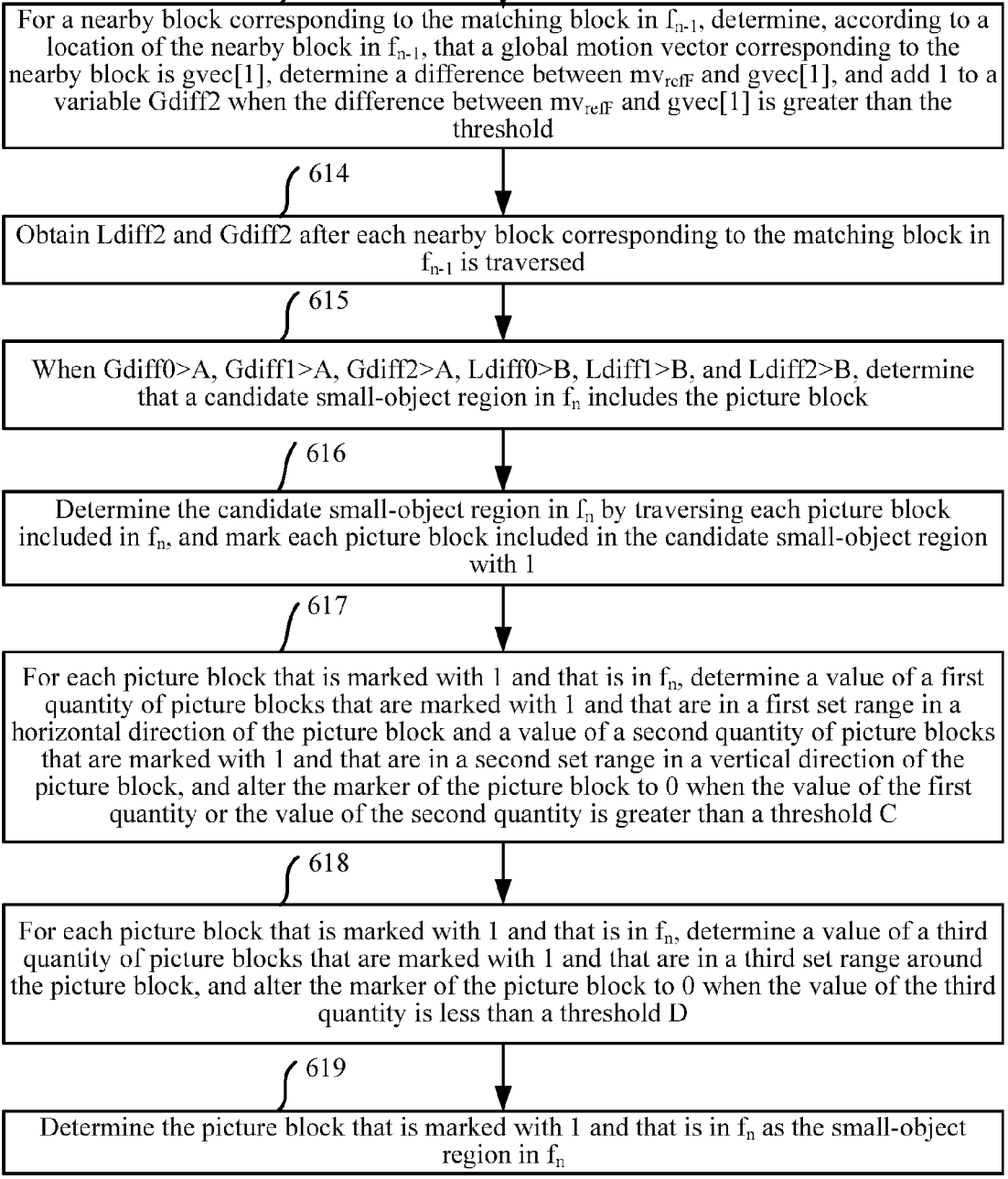

As shown in FIG. 6A, 6B, and FIG. 6C, a detailed method for determining a small-object region in a video frame according to an embodiment of the present disclosure includes the following steps.

Step 601: According to a to-be-processed picture block included in a small-object region determined in $f_{n-1}$, classify to-be-processed picture blocks included in each video frame of $f_{n-1}$, $f_n$, $f_{n+1}$, and $f_{n+2}$ into a first-type to-be-processed picture block and a second-type to-be-processed picture block, determine an interframe motion vector of each first-type to-be-processed picture block and an interframe motion vector of each second-type to-be-processed picture block, and obtain an interframe motion vector between $f_{n-1}$ and $f_n$, an interframe motion vector between $f_n$ and $f_{n+1}$, and an interframe motion vector between $f_{n+1}$ and $f_{n+2}$.

Step 602: Divide $f_n$ into fourth parts, and collect statistics on a global motion vector of each part to obtain gVec[i], where i={0, 1, 2, 3}.

Step 603: For a picture block included in $f_n$, determine, according to an interframe motion vector $mv_{oldF}$ of the picture block, a matching block that is in $f_{n+1}$ and that is of the picture block, and search for each nearby block corresponding to the matching block.

Step 604: For a nearby block corresponding to the matching block in $f_{n+1}$, determine an interframe motion vector $mv_{newB}$ of the nearby block, determine a sum of $mv_{newB}$ and $mv_{oldF}$, and add 1 to a variable Ldiff0 when the sum of $mv_{newB}$ and $mv_{oldF}$ is less than a threshold objLocal.

During specific implementation, an initial value of Ldiff0 may be set to 0.

Step 605: For a nearby block corresponding to the matching block in $f_{n+1}$, determine, according to a location of the nearby block in $f_{n+1}$, that a global motion vector corresponding to the nearby block is gVec[1], determine a difference between $mv_{newB}$ and gVec[1], and add 1 to a variable Gdiff0 when the difference between $mv_{newB}$ and gVec[1] is greater than a threshold objGlobal.

During specific implementation, an initial value of Gdiff0 may be set to 0.

Step 606: Obtain Ldiff0 and Gdiff0 after each nearby block corresponding to the matching block in $f_{n+1}$ is traversed.

Step 607: For a picture block included in $f_n$, determine, according to an interframe motion vector $mv_{oldF}$ of the picture block, a matching block that is in $f_{n+1}$ and that is of the picture block, determine, according to an interframe motion vector $mv_{newF}$ of the matching block, a matching block that is in $f_{n+2}$ and that is of the picture block, and search for each nearby block corresponding to the matching block.

Step 608: For a nearby block corresponding to the matching block in $f_{n+2}$, determine an interframe motion vector $mv_{refB}$ the nearby block, determine a sum of $mv_{refB}$ and $mv_{oldF}$, and add 1 to a variable Ldiff1 when the sum of $mv_{refB}$ and $mv_{oldF}$ is less than the threshold objLocal.

During specific implementation, an initial value of Ldiff1 may be set to 0.

Step 609: For a nearby block corresponding to the matching block in $f_{n+2}$, determine, according to a location of the nearby block in $f_{n+2}$, that a global motion vector corresponding to the nearby block is gVec[1], determine a difference between $mv_{refB}$ and gVec[1], and add 1 to a variable Gdiff1 when the difference between $mv_{refB}$ and gVec[1] is greater than the threshold objGlobal.

During specific implementation, an initial value of Gdiff1 may be set to 0.

Step 610: Obtain Ldiff1 and Gdiff1 after each nearby block corresponding to the matching block in $f_{n+2}$ is traversed.

Step 611: For a picture block included in $f_n$, determine, according to an interframe motion vector $mv_{oldB}$ of the picture block, a matching block that is in $f_{n-1}$ and that is of the picture block, and search for each nearby block corresponding to the matching block.

Step 612: For a nearby block corresponding to the matching block in $f_{n-1}$, determine an interframe motion vector $mv_{refF}$ of the nearby block, determine a difference between $mv_{refF}$ and $mv_{oldF}$ and add 1 to a variable Ldiff2 when the difference between $mv_{refF}$ and $mv_{oldF}$ is less than the threshold objLocal.

During specific implementation, an initial value of Ldiff2 may be set to 0.

Step 613: For a nearby block corresponding to the matching block in $f_{n-1}$ determine, according to a location of the nearby block in $f_{n-1}$, that a global motion vector corresponding to the nearby block is gVec[1], determine a difference between $mv_{refF}$ and gVec[1], and add 1 to a variable Gdiff2 when the difference between $mv_{refF}$ and gVec[1] is greater than the threshold objGlobal.

During specific implementation, an initial value of Gdiff2 may be set to 0.

Step 614: Obtain Ldiff2 and Gdiff2 after each nearby block corresponding to the matching block in $f_{n-1}$ is traversed.

Step 615: When Gdiff0>A, Gdiff1>A, Gdiff2>A, Ldiff0>B, Ldiff1>B, and Ldiff2>B, determine that a candidate small-object region in $f_n$ includes the picture block, and buffer the picture block in markFlagBuf0$_{ij}$.

During specific implementation, A and B are thresholds, and markFlagBuf0$_{ij}$ may be a memory that stores the picture block in a matrix form.

Step 616: Determine the candidate small-object region in $f_n$ by traversing each picture block included in $f_n$, and mark each picture block included in the candidate small-object region with 1.

Step 617: For each picture block that is marked with 1 and that is in $f_n$, determine a value of a first quantity of picture blocks that are marked with 1 and that are in a first set range in a horizontal direction of the picture block and a value of a second quantity of picture blocks that are marked with 1 and that are in a second set range in a vertical direction of the picture block, and alter the marker of the picture block to 0 when the value of the first quantity or the value of the second quantity is greater than a threshold C.

Step 618: For each picture block that is marked with 1 and that is in $f_n$, determine a value of a third quantity of picture blocks that are marked with 1 and that are in a third set range around the picture block, and alter the marker of the picture block to 0 when the value of the third quantity is less than a threshold D.

Step 619: Determine the picture block that is marked with 1 and that is in $f_n$ as the small-object region in $f_n$.

Figure 7:
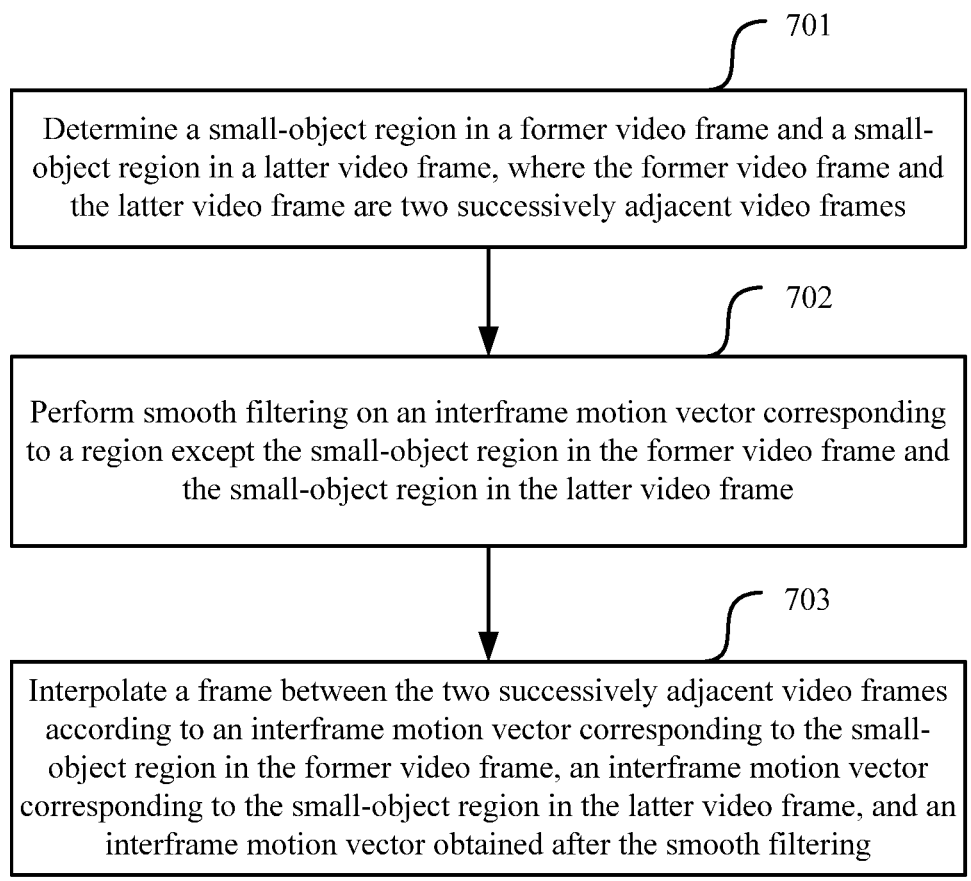
FIG. 7 is a schematic flowchart of a method for interpolating a frame between two adjacent video frames according to an embodiment of the present disclosure.

As shown in FIG. 7, a method for interpolating a frame between two adjacent video frames according to an embodiment of the present disclosure includes the following steps.

Step 701: Determine a small-object region in a former video frame and a small-object region in a latter video frame, where the former video frame and the latter video frame are two consecutively adjacent video frames.

Step 702: Perform smooth filtering on an interframe motion vector corresponding to a region except the small-object region in the former video frame and the small-object region in the latter video frame.

Step 703: Interpolate a frame between the two consecutively adjacent video frames according to an interframe motion vector corresponding to the small-object region in the former video frame, an interframe motion vector corresponding to the small-object region in the latter video frame, and an interframe motion vector obtained after the smooth filtering.

Preferably, in step 701, the method for determining a small-object region in a current video frame shown in FIG. 1 in the embodiments of the present disclosure may be used to determine the small-object region in the former video frame and the small-object region in the latter video frame, where the former video frame and the latter video frame are the two consecutively adjacent video frames.

During specific implementation, an interframe motion vector between the two consecutively adjacent video frames may be determined according to an interframe motion vector between the two consecutively adjacent video frames that is determined when the small-object region in the former video frame and the small-object region in the latter video frame are determined.

Preferably, in step 702, an implementation manner for performing the smooth filtering on the interframe motion vector corresponding to the region except the small-object region in the former video frame and the small-object region in the latter video frame is similar to an implementation manner for performing smooth filtering on an interframe motion vector between two adjacent video frames in the prior art. However, in the present disclosure, the smooth filtering is not performed on interframe motion vectors corresponding to small-object regions in two adjacent video frames, and the smooth filtering is performed only on an interframe motion vector corresponding to a region except the small-object regions in the two adjacent video frames.

Preferably, in step 703, an implementation manner for interpolating the frame between the two consecutively adjacent video frames according to the interframe motion vector corresponding to the small-object region in the former video frame, the interframe motion vector corresponding to the small-object region in the latter video frame, and the interframe motion vector obtained after the smooth filtering is similar to an implementation manner for interpolating a frame between two adjacent video frames according to an interframe motion vector between the two adjacent video frames in the prior art, and details are not repeatedly described herein.

During implementation, a small-object region in each video frame of two consecutively adjacent video frames is determined, smooth filtering is not performed on interframe motion vectors corresponding to the small-object regions determined in the two consecutively adjacent video frames, so that absence of pixels of the small-object in the generated interpolated frame is avoided, thereby improving display quality of a video.

Figure 8:
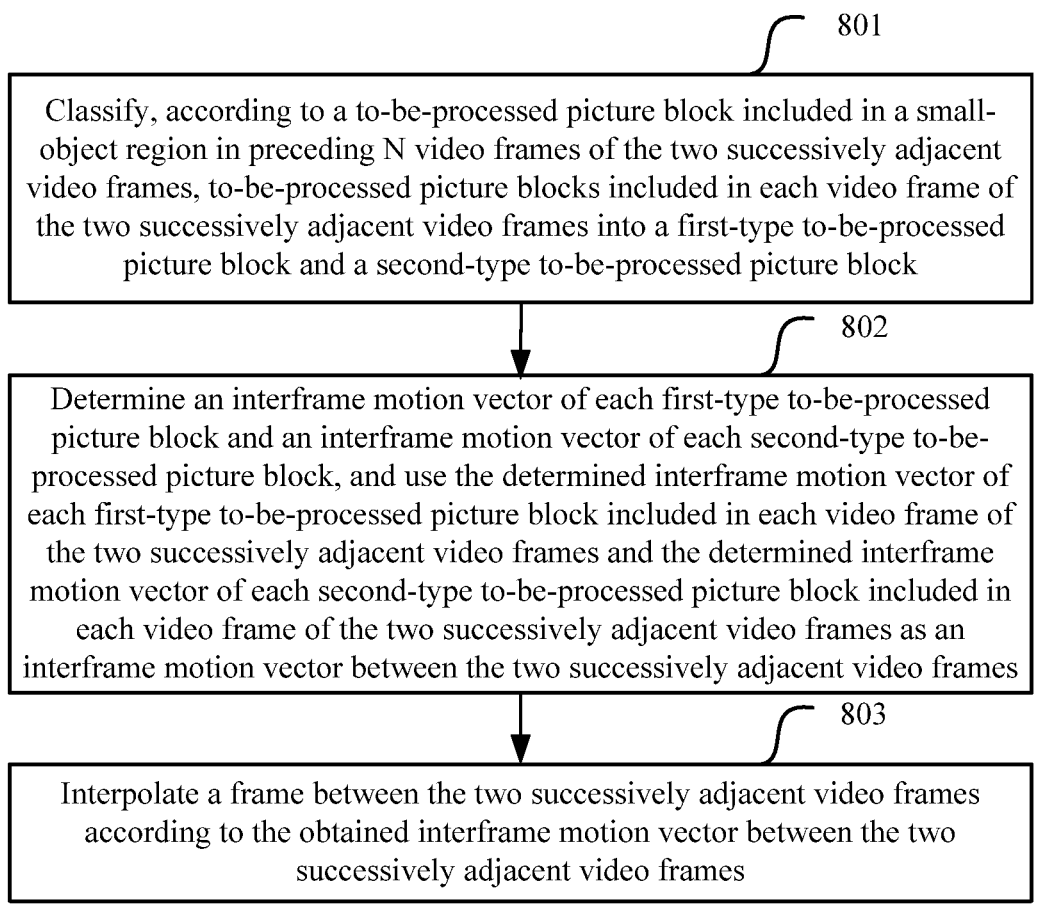
FIG. 8 is a schematic flowchart of a method for interpolating a frame between two adjacent video frames according to an embodiment of the present disclosure.

As shown in FIG. 8, a method for interpolating a frame between two adjacent video frames according to an embodiment of the present disclosure includes the following steps.

Step 801: Classify, according to a to-be-processed picture block included in a small-object region in preceding N video frames of the two consecutively adjacent video frames, to-be-processed picture blocks included in each video frame of the two consecutively adjacent video frames into a first-type to-be-processed picture block and a second-type to-be-processed picture block.

Step 802: Separately determine an interframe motion vector of each first-type to-be-processed picture block and an interframe motion vector of each second-type to-be-processed picture block, and use the determined interframe motion vector of each first-type to-be-processed picture block included in each video frame of the two consecutively adjacent video frames and the determined interframe motion vector of each second-type to-be-processed picture block included in each video frame of the two consecutively adjacent video frames as an interframe motion vector between the two consecutively adjacent video frames.

Step 803: Interpolate a frame between the two consecutively adjacent video frames according to the obtained interframe motion vector between the two consecutively adjacent video frames.

N is a positive integer.

Preferably, N may be set as needed or empirically.

Preferably, in step 801, the method for determining a small-object region in a current video frame shown in FIG. 1 in the embodiments of the present disclosure may be used to determine the small-object region in the preceding N video frames of the two consecutively adjacent video frames.

Preferably, in step 801, the classifying, according to a to-be-processed picture block included in a small-object region in preceding N video frames of the two consecutively adjacent video frames, to-be-processed picture blocks included in each video frame of the two consecutively adjacent video frames into a first-type to-be-processed picture block and a second-type to-be-processed picture block includes, for the to-be-processed picture block included in each video frame of the two consecutively adjacent video frames, executing the following: selecting at least one video frame from the preceding N video frames of the two consecutively adjacent video frames; determining, according to the small-object region in the preceding N video frames of the two consecutively adjacent video frames, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

Preferably, the selecting at least one video frame from the preceding N video frames includes selecting at least one preceding continuous video frame of the two consecutively adjacent video frames.

Preferably, in step 802, the determining an interframe motion vector of each first-type to-be-processed picture block includes the following steps.

Step D1: Determine a value of a dissimilarity between each candidate motion vector corresponding to the first-type to-be-processed picture block and a background motion vector of a video frame in which the first-type to-be-processed picture block is located.

During specific implementation, an implementation manner of step D1 is similar to the implementation manner of step A1 in the embodiments of the present disclosure, and details are not repeatedly described herein.

Step D2: Assign a corresponding weight to each candidate motion vector according to the determined value of the dissimilarity corresponding to each candidate motion vector by using a rule that a smaller weight is assigned to a larger value of the dissimilarity.

During specific implementation, an implementation manner of step D2 is similar to the implementation manner of step A2 in the embodiments of the present disclosure, and details are not repeatedly described herein.

Step D3: Determine the interframe motion vector of the first-type to-be-processed picture block according to the weight assigned to each candidate motion vector and a SAD value of pixels of a picture block pointed to by each candidate motion vector and pixels of the first-type to-be-processed picture block.

During specific implementation, an implementation manner of step D3 is similar to the implementation manner of step A3 in the embodiments of the present disclosure, and details are not repeatedly described herein.

Preferably, in step D3, the determining the interframe motion vector of the first-type to-be-processed picture block includes, for each candidate motion vector, determining a product of the weight assigned to the candidate motion vector and the SAD value of the pixels of the picture block pointed to by the candidate motion vector and the pixels of the first-type to-be-processed picture block, and using a candidate motion vector with a smallest product as the interframe motion vector of the first-type to-be-processed picture block.

It should be noted that, there are multiple implementation manners for determining the interframe motion vector of the first-type to-be-processed picture block according to the weight corresponding to each candidate motion vector of the first-type to-be-processed picture block and the SAD value of the pixels of the picture block pointed to by the candidate motion vector and pixels of the first-type to-be-processed picture block, for example, for each candidate motion vector corresponding to the first-type to-be-processed picture block, a sum of the weight assigned to the candidate motion vector and the SAD value of the pixels of the picture block pointed to by the candidate motion vector and pixels of the first-type to-be-processed picture block is determined, and a candidate motion vector with a smallest sum is used as the interframe motion vector of the first-type to-be-processed picture block. Implementation manners enumerated in this embodiment of the present disclosure are merely exemplary implementation manners.

Preferably, in step 803, an implementation manner for interpolating the frame between the two consecutively adjacent video frames according to the obtained interframe motion vector between the two consecutively adjacent video frames is similar to an implementation manner for interpolating a frame between two adjacent video frames according to an interframe motion vector between the two adjacent video frames in the prior art, and details are not repeatedly described herein.

During implementation, smooth filtering is not performed on an interframe motion vector between two consecutively adjacent video frames, and a frame is interpolated between the two adjacent video frames directly according to an obtained interframe motion vector between the two adjacent video frames, so that absence of pixels of the small-object in the generated interpolated frame is avoided, thereby improving playback quality of a high-definition video or an ultra-high-definition video.

It should be noted that, there are multiple implementation manners of the method for interpolating a frame between two adjacent video frames in the present disclosure, and the following describes, by using interpolation of a frame between $f_n$ and $f_{n+1}$ as an example, in detail three exemplary implementation manners for interpolating a frame between two adjacent video frames according to this embodiment of the present disclosure.

It is assumed that reference frames of $f_n$ are $f_{n-1}$ and $f_{n+1}$, reference frames of $f_{n+1}$ are $f_n$ and $f_{n+2}$.

Implementation Manner 1

Figure 9:
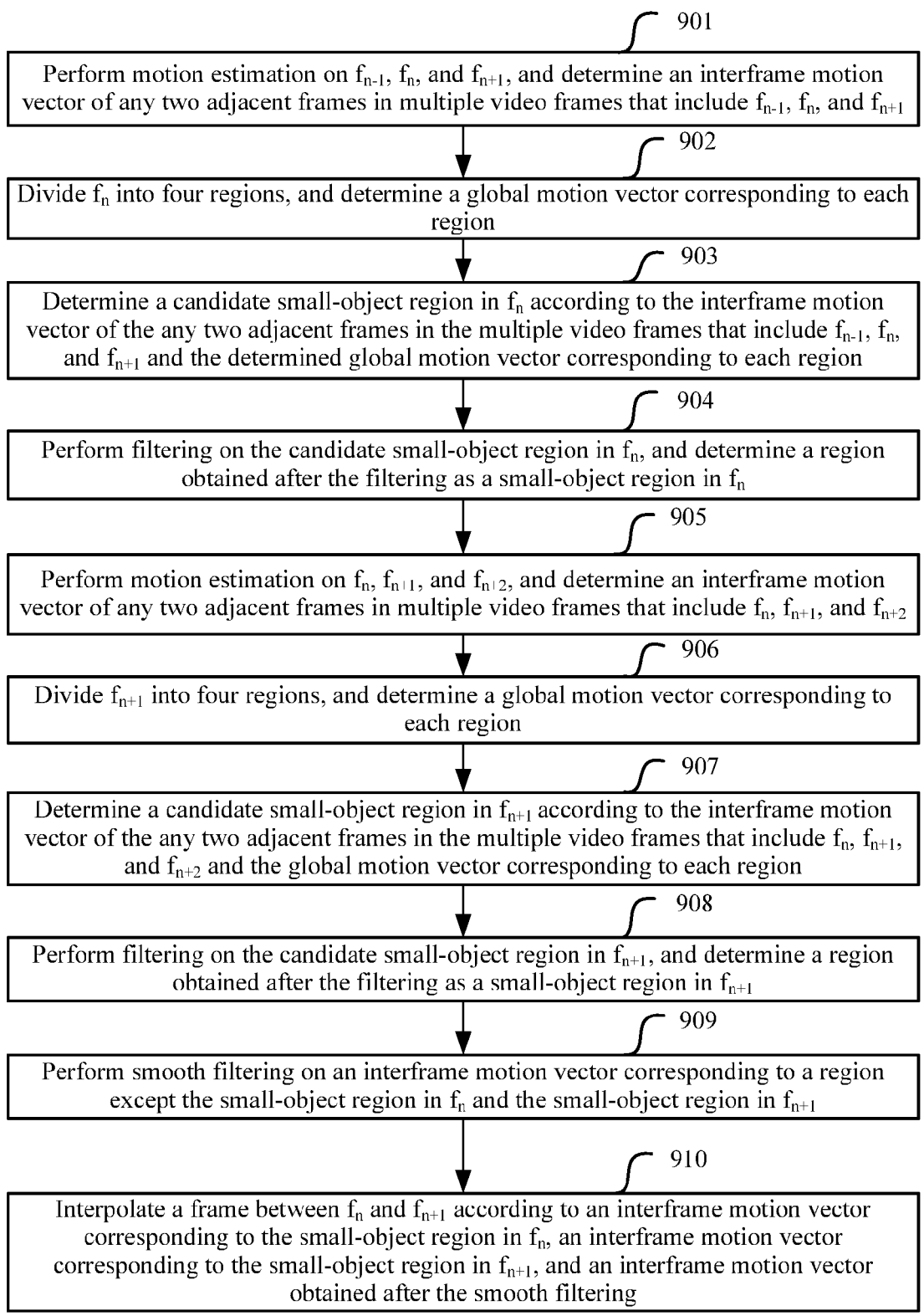
FIG. 9 is a schematic flowchart of a method for interpolating a frame between $f_n$ and $f_{n+1}$ according to an embodiment of the present disclosure.

As shown in FIG. 9, a method for interpolating a frame between two adjacent video frames according to an embodiment of the present disclosure includes the following steps.

Step 901: Perform motion estimation on $f_{n-1}$, $f_n$, and $f_{n+1}$, and determine an interframe motion vector of any two adjacent frames in multiple video frames that include $f_{n-1}$, $f_n$ and $f_{n+1}$.

Step 902: Divide $f_n$ into four regions, and determine a global motion vector corresponding to each region.

Step 903: Determine a candidate small-object region in $f_n$ according to the interframe motion vector of the any two adjacent frames in the multiple video frames that include $f_{n-1}$, $f_n$, and $f_{n+1}$ and the determined global motion vector corresponding to each region.

Step 904: Perform filtering on the candidate small-object region in $f_n$, and determine a region obtained after the filtering as a small-object region in $f_n$.

Step 905: Perform motion estimation on $f_n$, $f_{n+1}$, and $f_{n-2}$, and determine an interframe motion vector of any two adjacent frames in multiple video frames that include $f_n$, $f_{n+1}$, and $f_{n+2}$.

During specific implementation, because the motion estimation is already performed on $f_n$ and $f_{n+1}$ in step 901, the motion estimation may be performed only on $f_{n+1}$ and $f_{n+2}$ in step 905 to obtain an interframe motion vector between $f_{n+1}$ and $f_{n+2}$.

Step 906: Divide $f_{n+1}$ into four regions, and determine a global motion vector corresponding to each region.

Step 907: Determine a candidate small-object region in $f_{n+1}$ according to the interframe motion vector of the any two adjacent frames in the multiple video frames that include $f_n$, $f_{n+1}$, and $f_{n+2}$ and the determined global motion vector corresponding to each region.

Step 908: Perform filtering on the candidate small-object region in $f_{n+1}$, and determine a region obtained after the filtering as a small-object region in $f_{n+1}$.

Step 909: Perform smooth filtering on an interframe motion vector corresponding to a region except the small-object region in $f_n$ and the small-object region in $f_{n+1}$.

It should be noted that, a forward motion vector and a backward motion vector between $f_n$ and $f_{n+1}$ are determined at a same time both in step 901 and step 905, interframe motion vectors of $f_n$ and $f_{n+1}$ in step 909 are the forward motion vector and the backward motion vector that are between $f_n$ and $f_{n+1}$ and that are determined in step 905.

It should be noted that, step 901 to step 909 of this embodiment of the present disclosure are descriptions about determining small-object regions in $f_n$ and $f_{n+1}$ at different times; but in a specific application, the small-object regions in $f_n$ and $f_{n+1}$ may be determined at a same time, and when the small-object regions in $f_n$ and $f_{n+1}$ are determined at the same time, motion estimation needs to be performed on $f_{n-1}$, $f_n$, $f_{n+1}$, and $f_{n+2}$ at a same time. Steps of determining the small-object regions in $f_n$ and $f_{n+1}$ at a same time are as follows.

Step 1: Perform motion estimation on $f_{n-1}$, $f_n$, $f_{n+1}$, and $f_{n+2}$, and determine an interframe motion vector of any two adjacent frames in multiple video frames that include $f_{n-1}$, $f_n$, $f_{n+1}$, and $f_{n+2}$.

Step 2: Separately divide $f_n$ and $f_{n+1}$ into four regions, and determine a global motion vector corresponding to each region.

Step 3: Determine a candidate small-object region in $f_n$ according to an interframe motion vector of any two adjacent frames in multiple video frames that include $f_{n-1}$, $f_n$, and $f_{n+1}$ and the determined global motion vector corresponding to each region in $f_n$; and determine a candidate small-object region in $f_{n+1}$ according to an interframe motion vector of any two adjacent frames in multiple video frames that include $f_n$, $f_{n+1}$, and $f_{n+2}$ and the determined global motion vector corresponding to each region in $f_{n+1}$.

Step 4: Perform filtering on the candidate small-object region in $f_n$, and determine a region obtained after the filtering as the small-object region of $f_n$; and perform filtering on the candidate small-object region in $f_{n+1}$, and determine a region obtained after the filtering as the small-object region in $f_{n+1}$.

Step 910: Interpolate a frame between $f_n$ and $f_{n+1}$ according to an interframe motion vector corresponding to the small-object region in $f_n$, an interframe motion vector corresponding to the small-object region in $f_{n+1}$, and an interframe motion vector obtained after the smooth filtering.

During specific implementation, to-be-processed picture blocks included in each video frame in two consecutively adjacent video frames may be classified according to a small-object region determined in a video frame before the two consecutively adjacent video frames, which is described in the following Implementation Manner 2.

Implementation Manner 2

Figure 10:
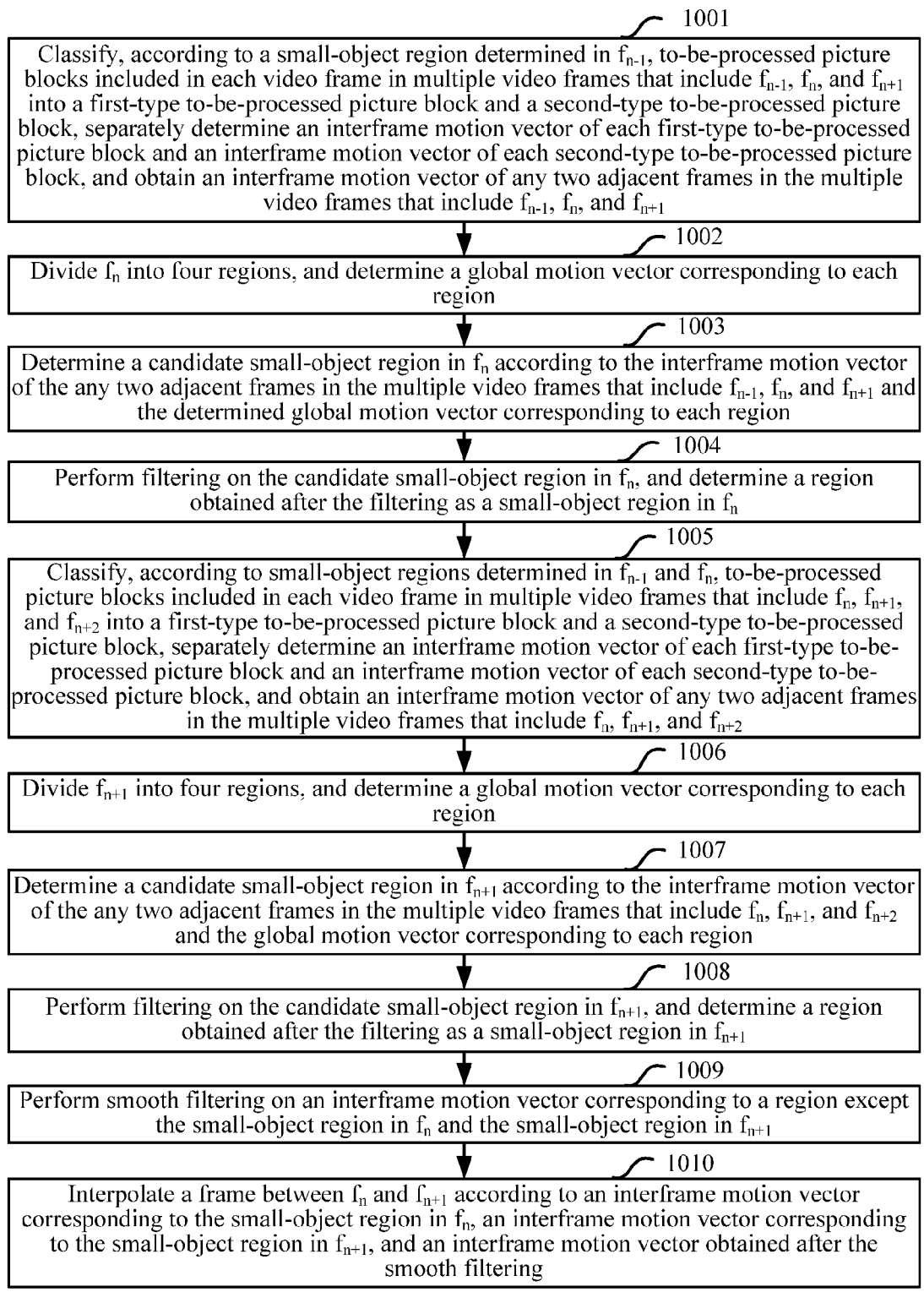
FIG. 10 is a schematic flowchart of a method for interpolating a frame between $f_n$ and $f_{n+1}$ according to an embodiment of the present disclosure.

As shown in FIG. 10, a method for interpolating a frame between two adjacent video frames according to an embodiment of the present disclosure includes the following steps.

Step 1001: Classify, according to a to-be-processed picture block included in a small-object region determined in $f_{n-1}$, to-be-processed picture blocks included in each video frame in multiple video frames that include $f_{n-1}$, $f_n$, and $f_{n+1}$ into a first-type to-be-processed picture block and a second-type to-be-processed picture block, separately determine an interframe motion vector of each first-type to-be-processed picture block and an interframe motion vector of each second-type to-be-processed picture block, and obtain an interframe motion vector of any two adjacent frames in the multiple video frames that include $f_{n-1}$, $f_n$, and $f_{n+1}$.

Step 1002: Divide $f_n$ into four regions, and determine a global motion vector corresponding to each region.

Step 1003: Determine a candidate small-object region in $f_n$ according to the interframe motion vector of the any two adjacent frames in the multiple video frames that include $f_{n-1}$, $f_n$, and $f_{n+1}$ and the determined global motion vector corresponding to each region.

Step 1004: Perform filtering on the candidate small-object region in $f_n$, and determine a region obtained after the filtering as a small-object region in $f_n$.

Step 1005: Classify, according to to-be-processed picture blocks included in the small-object regions determined in $f_{n-1}$ and $f_n$, to-be-processed picture blocks included in each video frame in multiple video frames that include $f_n$, $f_{n+1}$, and $f_{n+2}$ into a first-type to-be-processed picture block and a second-type to-be-processed picture block, separately determine an interframe motion vector of each first-type to-be-processed picture block and an interframe motion vector of each second-type to-be-processed picture block, and obtain an interframe motion vector of any two adjacent frames in the multiple video frames that include $f_n$, $f_{n+1}$, and $f_{n+2}$.

Step 1006: Divide $f_{n+1}$ into four regions, and determine a global motion vector corresponding to each region.

Step 1007: Determine a candidate small-object region in $f_{n+1}$ according to the interframe motion vector of the any two adjacent frames in the multiple video frames that include $f_n$, $f_{n+1}$, and $f_{n+2}$ and the determined global motion vector corresponding to each region.

Step 1008: Perform filtering on the candidate small-object region in $f_{n+1}$, and determine a region obtained after the filtering as a small-object region in $f_{n+1}$.

Step 1009: Perform smooth filtering on an interframe motion vector corresponding to a region except the small-object region in $f_n$ and the small-object region in $f_{n+1}$.

Step 1010: Interpolate a frame between f and $f_{n+1}$ according to an interframe motion vector corresponding to the small-object region in $f_n$, an interframe motion vector corresponding to the small-object region in $f_{n+1}$, and an interframe motion vector obtained after the smooth filtering.

During specific implementation, smooth filtering may not be performed on an interframe motion vector between f and $f_{n+1}$, and a frame is interpolated between $f_n$ and $f_{n+1}$ directly according to the interframe motion vector between $f_n$ and $f_{n+1}$, which is described in the following Implementation Manner 3.

Implementation Manner 3

Figure 11:
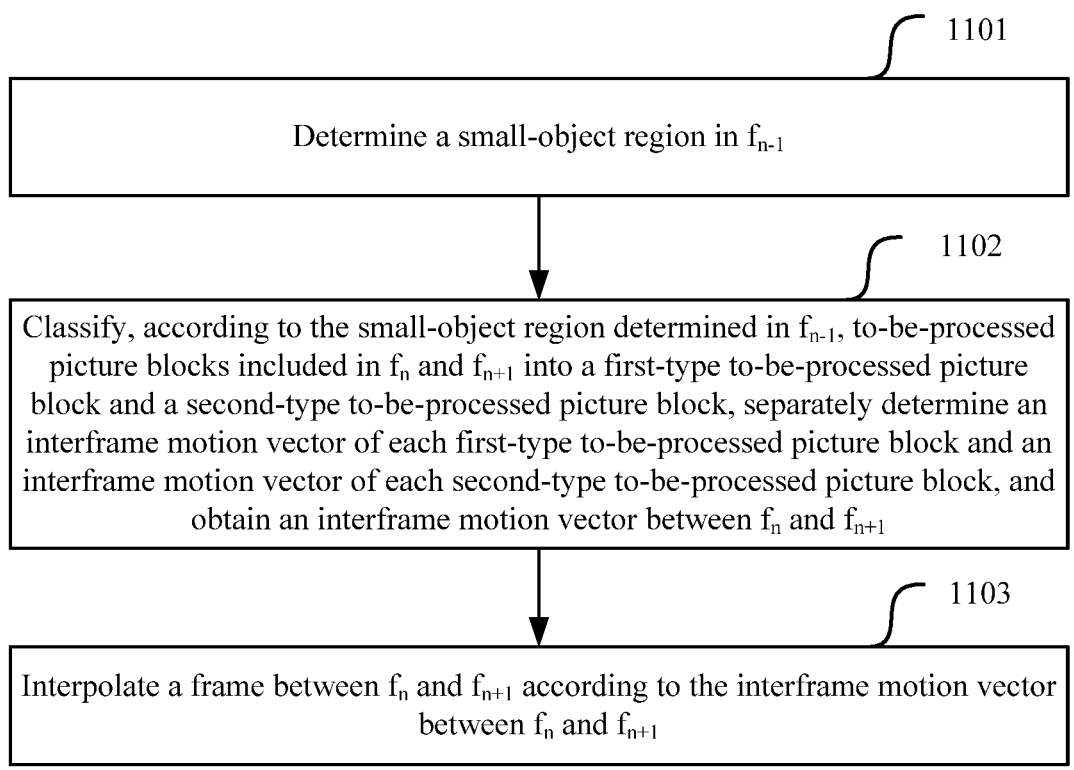
FIG. 11 is a schematic flowchart of a method for interpolating a frame between f and $f_{n+1}$ according to an embodiment of the present disclosure.

As shown in FIG. 11, a method for interpolating a frame between two adjacent video frames according to an embodiment of the present disclosure includes the following steps.

Step 1101: Determine a small-object region in $f_{n-1}$.

Step 1102: Classify, according to a to-be-processed picture block included in the small-object region determined in $f_{n-1}$, to-be-processed picture blocks included in $f_n$ and $f_{n+1}$ into a first-type to-be-processed picture block and a second-type to-be-processed picture block, separately determine an interframe motion vector of each first-type to-be-processed picture block and an interframe motion vector of each second-type to-be-processed picture block, and obtain an interframe motion vector between $f_n$ and $f_{n+1}$.

Step 1103: Interpolate a frame between $f_n$ and $f_{n+1}$ according to the interframe motion vector between $f_n$ and $f_{n+1}$.

Based on a same disclosure concept, embodiments of the present disclosure further provide an apparatus for determining a small-object region in a video frame and an apparatus for interpolating a frame between two adjacent video frames, of which principles are similar to those of the method for determining a small-object region in a video frame and those of the method for interpolating a frame between two adjacent video frames, and therefore, during implementation, reference may be made to the methods, and details are not repeatedly described.

Figure 12:
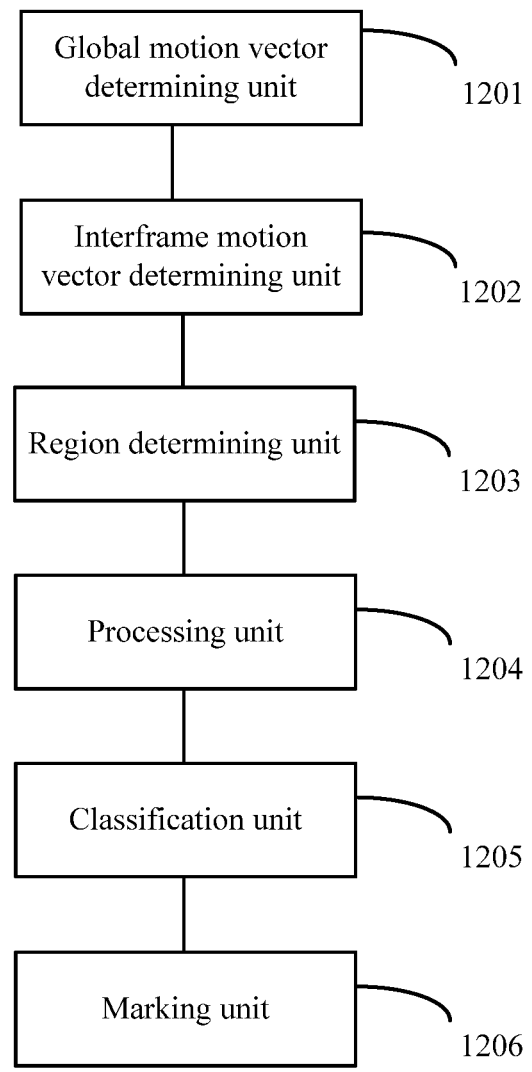
FIG. 12 is a schematic structural diagram of an apparatus for determining a small-object region in a video frame according to an embodiment of the present disclosure.

FIG. 12 is a schematic structural diagram of an apparatus for determining a small-object region in a video frame according to an embodiment of the present disclosure. As shown in the figure, the apparatus for determining a small-object region in a video frame includes a global motion vector determining unit 1201 configured to divide a current video frame into at least two regions, determine a global motion vector corresponding to each region, and transmit the determined global motion vector to a region determining unit 1203; an interframe motion vector determining unit 1202 configured to determine an interframe motion vector of each group of adjacent frames in multiple video frames that include the current video frame and a reference frame of the current video frame, and transmit the determined interframe motion vector to the region determining unit 1203; the region determining unit 1203 configured to determine information about a candidate small-object region in the current video frame according to the interframe motion vector that is of the each group of adjacent frames in the multiple video frames that include the current video frame and the reference frame of the current video frame and that is from the interframe motion vector determining unit 1202 and the global motion vector that is corresponding to each region and that is from the global motion vector determining unit 1201, and transmit the information about the determined candidate small-object region in the current video frame to a processing unit 1204; and the processing unit 1204 configured to determine the candidate small-object region in the current video frame according to the information that is about the candidate small-object region in the current video frame and that is from the region determining unit 1203, perform filtering on the candidate small-object region in the current video frame, and determine a region obtained after the filtering as a small-object region in the current video frame.

The reference frame of the current video frame includes one or more of preceding continuous video frames of the current video frame and following continuous video frames of the current video frame.

Preferably, the apparatus further includes a classification unit 1205 configured to execute, before the interframe motion vector of the each group of adjacent frames in the multiple video frames that include the current video frame and the reference frame of the current video frame is determined, the following for a to-be-processed picture block included in each video frame in the each group of adjacent frames in the multiple video frames that include the current video frame and the reference frame of the current video frame: selecting at least one video frame from preceding N video frames of the current video frame; determining, according to a small-object region determined in the preceding N video frames of the current video frame, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

The interframe motion vector determining unit 1202 is configured to separately determine an interframe motion vector of each first-type to-be-processed picture block and an interframe motion vector of each second-type to-be-processed picture block; and use the determined interframe motion vector of each first-type to-be-processed picture block included in each video frame in the each group of adjacent frames and the determined interframe motion vector of each second-type to-be-processed picture block included in each video frame in the each group of adjacent frames as the interframe motion vector of the each group of adjacent frames.

Preferably, the interframe motion vector determining unit 1202 is configured to determine a value of a dissimilarity between each candidate motion vector corresponding to the first-type to-be-processed picture block and a background motion vector of a video frame in which the first-type to-be-processed picture block is located; assign a corresponding weight to each candidate motion vector according to the determined value of the dissimilarity corresponding to each candidate motion vector by using a rule that a smaller weight is assigned to a larger value of the dissimilarity; and determine the interframe motion vector of the first-type to-be-processed picture block according to the weight assigned to each candidate motion vector and a SAD value of pixels of a picture block pointed to by each candidate motion vector and pixels of the first-type to-be-processed picture block.

Preferably, the classification unit 1205 is configured to select at least one preceding continuous video frame of the current video frame.

Preferably, the interframe motion vector determining unit 1202 is configured to, for each candidate motion vector, determine a product of the weight assigned to the candidate motion vector and the SAD value of the pixels of the picture block pointed to by the candidate motion vector and the pixels of the first-type to-be-processed picture block, and use a candidate motion vector with a smallest product as the interframe motion vector of the first-type to-be-processed picture block.

Preferably, the region determining unit 1203 is configured to determine, in each reference frame of the current video frame and according to the interframe motion vector of the each group of adjacent frames in the multiple video frames that include the current video frame and the reference frame of the current video frame, a matching block corresponding to each picture block included in the current video frame; determine, in each reference frame, a nearby block near the matching block, and determine an interframe motion vector of each nearby block determined in each reference frame; for each picture block included in the current video frame, determine a value of a similarity between the interframe motion vector of each nearby block determined for the picture block and an interframe motion vector of the picture block, and determine a value of a dissimilarity between the interframe motion vector and a global motion vector that are of each nearby block; and determine, according to the determined value of the similarity and the determined value of the dissimilarity, a picture block included in the candidate small-object region in the current video frame, where each picture block included in the candidate small-object region meets the following: in multiple nearby blocks that are determined for the picture block and that are included in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

Preferably, the apparatus further includes a marking unit 1206 configured to mark, before filtering is performed on the candidate small-object region in the current video frame, a specific marker on each picture block included in the candidate small-object region.

The processing unit 1204 is configured to, for each picture block included in the candidate small-object region in the current video frame, determine a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block; remove the specific marker of the picture block when the determined value of the first quantity or the determined value of the second quantity is greater than a third threshold; determine a value of a third quantity of picture blocks that are marked with the specific marker and that are in a third set range around the picture block; remove the specific marker of the picture block when the determined value of the third quantity is less than a fourth threshold; and determine the picture block that is marked with the specific marker and that is in the current video frame as the small-object region in the current video frame; where the third set range is smaller than the first set range and the second set range, and the fourth threshold is less than the third threshold.

Figure 13:
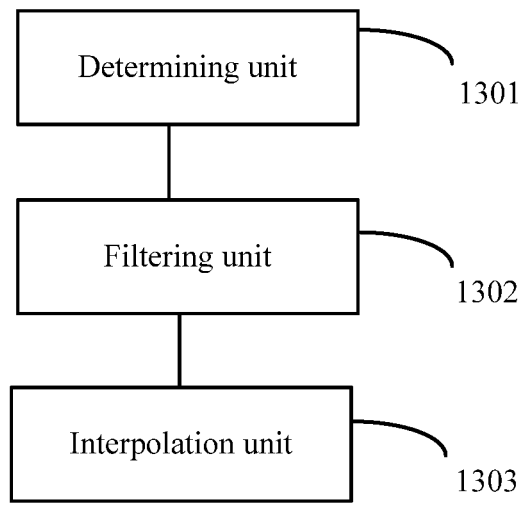
FIG. 13 is a schematic structural diagram of an apparatus for interpolating a frame between two adjacent video frames according to an embodiment of the present disclosure.

FIG. 13 is a schematic structural diagram of an apparatus for interpolating a frame between two adjacent video frames according to an embodiment of the present disclosure. As shown in the figure, the apparatus for interpolating a frame between two adjacent video frames includes a determining unit 1301 configured to determine a small-object region in a former video frame and a small-object region in a latter video frame, where the former video frame and the latter video frame are two consecutively adjacent video frames, and transmit information about the determined small-object region in the former video frame and information about the determined small-object region in the latter video frame to a filtering unit 1302; the filtering unit 1302 configured to determine, according to the information that is about the small-object region in the former video frame and that is from the determining unit 1301 and the information that is about the small-object region in the latter video frame and that is from the determining unit 1301, the small-object region in the former video frame and the small-object region in the latter video frame, perform smooth filtering on an interframe motion vector corresponding to a region except the small-object region in the former video frame and the small-object region in the latter video frame, and transmit an interframe motion vector obtained after the smooth filtering to an interpolation unit 1303; and the interpolation unit 1303 configured to interpolate a frame between the two consecutively adjacent video frames according to the interframe motion vector that is obtained after the smooth filtering and that is from the filtering unit 1302, an interframe motion vector corresponding to the small-object region in the former video frame, and an interframe motion vector corresponding to the small-object region in the latter video frame.

Figure 14:
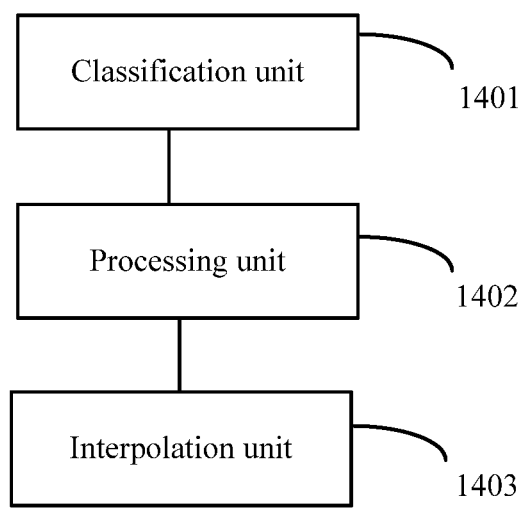
FIG. 14 is a schematic structural diagram of an apparatus for interpolating a frame between two adjacent video frames according to an embodiment of the present disclosure.

FIG. 14 is a schematic structural diagram of an apparatus for interpolating a frame between two adjacent video frames according to an embodiment of the present disclosure. As shown in the figure, the apparatus for interpolating a frame between two adjacent video frames includes a classification unit 1401 configured to classify, according to a to-be-processed picture block included in a small-object region in preceding N video frames of two consecutively adjacent video frames, to-be-processed picture blocks included in each video frame of the two consecutively adjacent video frames into a first-type to-be-processed picture block and a second-type to-be-processed picture block, and transmit classification information corresponding to the first-type to-be-processed picture block and the second-type to-be-processed picture block to a processing unit 1402; the processing unit 1402 configured to determine, according to the classification information from the classification unit 1401, the first-type to-be-processed picture block and the second-type to-be-processed picture block that are in the to-be-processed picture blocks included in each video frame in the two consecutively adjacent video frames; separately determine an interframe motion vector of each first-type to-be-processed picture block and an interframe motion vector of each second-type to-be-processed picture block, and use the determined interframe motion vector of each first-type to-be-processed picture block included in each video frame of the two consecutively adjacent video frames and the determined interframe motion vector of each second-type to-be-processed picture block included in each video frame of the two consecutively adjacent video frames as an interframe motion vector between the two consecutively adjacent video frames; and transmit the interframe motion vector between the two consecutively adjacent video frames to an interpolation unit 1403; and the interpolation unit 1403 configured to interpolate a frame between the two consecutively adjacent video frames according to the interframe motion vector that is of the two consecutively adjacent video frames and that is from the processing unit 1402, where N is a positive integer.

Preferably, the classification unit 1401 is configured to execute the following for the to-be-processed picture block included in each video frame of the two consecutively adjacent video frames: selecting at least one video frame from the preceding N video frames of the two consecutively adjacent video frames; determining, according to the small-object region in the preceding N video frames of the two consecutively adjacent video frames, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

Preferably, the processing unit 1402 is configured to determine a value of a dissimilarity between each candidate motion vector corresponding to the first-type to-be-processed picture block and a background motion vector of a video frame in which the first-type to-be-processed picture block is located; assign a corresponding weight to each candidate motion vector according to the determined value of the dissimilarity corresponding to each candidate motion vector by using a rule that a smaller weight is assigned to a larger value of the dissimilarity; and determine the interframe motion vector of the first-type to-be-processed picture block according to the weight assigned to each candidate motion vector and a SAD value of pixels of a picture block pointed to by each candidate motion vector and pixels of the first-type to-be-processed picture block.

Preferably, the classification unit 1401 is configured to select at least one preceding continuous video frame of the two consecutively adjacent video frames.

Preferably, the processing unit 1402 is configured to, for each candidate motion vector, determine a product of the weight assigned to the candidate motion vector and the SAD value of the pixels of the picture block pointed to by the candidate motion vector and the pixels of the first-type to-be-processed picture block, and use a candidate motion vector with a smallest product as the interframe motion vector of the first-type to-be-processed picture block.

Figure 15:
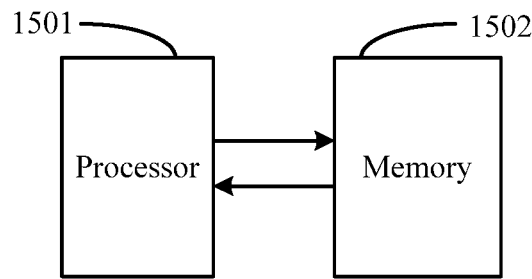
FIG. 15 is a schematic structural diagram of an apparatus for determining a small-object region in a video frame according to an embodiment of the present disclosure.

FIG. 15 is a schematic structural diagram of an apparatus for determining a small-object region in a video frame according to an embodiment of the present disclosure. As shown in the figure, the apparatus for determining a small-object region in a video frame includes a processor 1501 configured to divide a current video frame into at least two regions, and determine a global motion vector corresponding to each region; determine an interframe motion vector of each group of adjacent frames in multiple video frames that include the current video frame and a reference frame of the current video frame; determine a candidate small-object region in the current video frame according to the interframe motion vector of the each group of adjacent frames in the multiple video frames that include the current video frame and the reference frame of the current video frame and the global motion vector corresponding to each region; and perform filtering on the candidate small-object region in the current video frame, and determine a region obtained after the filtering as a small-object region in the current video frame; and a memory 1502 configured to store the global motion vector corresponding to each region, the interframe motion vector of the each group of adjacent frames, information about the candidate small-object region in the current video frame, and information about the small-object region in the current video frame.

The reference frame of the current video frame includes one or more of preceding continuous video frames of the current video frame and following continuous video frames of the current video frame.

During specific implementation, the processor 1501 may directly invoke a required vector or required information from the memory 1502; or the processor 1501 may send a vector or information acquiring instruction to the memory 1502, and the memory 1502 sends, to the processor 1501, a vector or information requested in the instruction sent by the processor 1501.

Preferably, the processor 1501 is further configured to execute, before the interframe motion vector of the each group of adjacent frames in the multiple video frames that include the current video frame and the reference frame of the current video frame is determined, the following for a to-be-processed picture block included in each video frame in the each group of adjacent frames in the multiple video frames that include the current video frame and the reference frame of the current video frame: selecting at least one video frame from preceding N video frames of the current video frame; determining, according to a small-object region determined in the preceding N video frames of the current video frame, whether a reference picture block that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

The processor 1501 is configured to separately determine an interframe motion vector of each first-type to-be-processed picture block and an interframe motion vector of each second-type to-be-processed picture block; and use the determined interframe motion vector of each first-type to-be-processed picture block included in each video frame in the each group of adjacent frames and the determined interframe motion vector of each second-type to-be-processed picture block included in each video frame in the each group of adjacent frames as the interframe motion vector of the each group of adjacent frames.

Preferably, the processor 1501 is configured to determine a value of a dissimilarity between each candidate motion vector corresponding to the first-type to-be-processed picture block and a background motion vector of a video frame in which the first-type to-be-processed picture block is located; assign a corresponding weight to each candidate motion vector according to the determined value of the dissimilarity corresponding to each candidate motion vector by using a rule that a smaller weight is assigned to a larger value of the dissimilarity; and determine the interframe motion vector of the first-type to-be-processed picture block according to the weight assigned to each candidate motion vector and a SAD value of pixels of a picture block pointed to by each candidate motion vector and pixels of the first-type to-be-processed picture block.

Preferably, the processor 1501 is configured to select at least one preceding continuous video frame of the current video frame.

Preferably, the processor 1501 is configured to, for each candidate motion vector, determine a product of the weight assigned to the candidate motion vector and the SAD value of the pixels of the picture block pointed to by the candidate motion vector and the pixels of the first-type to-be-processed picture block, and use a candidate motion vector with a smallest product as the interframe motion vector of the first-type to-be-processed picture block.

Preferably, the processor 1501 is configured to determine, in each reference frame of the current video frame and according to the interframe motion vector of the each group of adjacent frames in the multiple video frames that include the current video frame and the reference frame of the current video frame, a matching block corresponding to each picture block included in the current video frame; determine, in each reference frame, a nearby block near the matching block, and determine an interframe motion vector of each nearby block determined in each reference frame; for each picture block included in the current video frame, determine a value of a similarity between the interframe motion vector of each nearby block determined for the picture block and an interframe motion vector of the picture block, and determine a value of a dissimilarity between the interframe motion vector and a global motion vector that are of each nearby block; and determine, according to the determined value of the similarity and the determined value of the dissimilarity, a picture block included in the candidate small-object region in the current video frame, where each picture block included in the candidate small-object region meets the following: in multiple nearby blocks that are determined for the picture block and that are included in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

Preferably, the processor 1501 is further configured to mark, before filtering is performed on the candidate small-object region in the current video frame, a specific marker on each picture block included in the candidate small-object region.

The processor 1501 is configured to, for each picture block included in the candidate small-object region in the current video frame, determine a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block; remove the specific marker of the picture block when the determined value of the first quantity or the determined value of the second quantity is greater than a third threshold; determine a value of a third quantity of picture blocks that are marked with the specific marker and that are in a third set range around the picture block; remove the specific marker of the picture block when the determined value of the third quantity is less than a fourth threshold; and determine the picture block that is marked with the specific marker and that is in the current video frame as the small-object region in the current video frame; where the third set range is smaller than the first set range and the second set range, and the fourth threshold is less than the third threshold.

Figure 16:
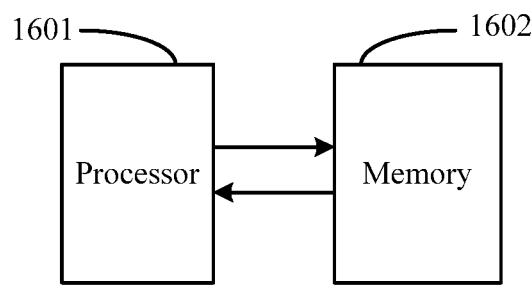
FIG. 16 is a schematic structural diagram of an apparatus for interpolating a frame between two adjacent video frames according to an embodiment of the present disclosure.

FIG. 16 is a schematic structural diagram of an apparatus for interpolating a frame between two adjacent video frames according to an embodiment of the present disclosure. As shown in the figure, the apparatus for interpolating a frame between two adjacent video frames includes a processor 1601 configured to determine a small-object region in a former video frame and a small-object region in a latter video frame, where the former video frame and the latter video frame are two consecutively adjacent video frames; perform smooth filtering on an interframe motion vector corresponding to a region except the small-object region in the former video frame and the small-object region in the latter video frame; and interpolate a frame between the two consecutively adjacent video frames according to an interframe motion vector obtained after the smooth filtering, an interframe motion vector corresponding to the small-object region in the former video frame, and an interframe motion vector corresponding to the small-object region in the latter video frame; and a memory 1602 configured to store information about the small-object region in the former video frame, information about the small-object region in the latter video frame, and the interframe motion vector between the two consecutively adjacent video frames.

During specific implementation, the processor 1601 may directly invoke a required vector or required information from the memory 1602; or the processor 1601 may send a vector or information acquiring instruction to the memory 1602, and the memory 1602 sends, to the processor 1601, a vector or information requested in the instruction sent by the processor 1601.

Figure 17:
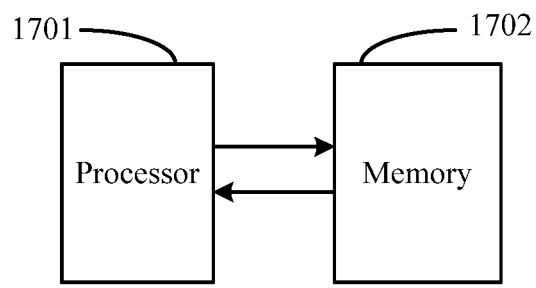
FIG. 17 is a schematic structural diagram of an apparatus for interpolating a frame between two adjacent video frames according to an embodiment of the present disclosure.

FIG. 17 is a schematic structural diagram of an apparatus for interpolating a frame between two adjacent video frames according to an embodiment of the present disclosure. As shown in the figure, the apparatus for interpolating a frame between two adjacent video frames includes a processor 1701 configured to classify, according to a to-be-processed picture block included in a small-object region in preceding N video frames of the two consecutively adjacent video frames, to-be-processed picture blocks included in each video frame of the two consecutively adjacent video frames into a first-type to-be-processed picture block and a second-type to-be-processed picture block; separately determine an interframe motion vector of each first-type to-be-processed picture block and an interframe motion vector of each second-type to-be-processed picture block, and use the determined interframe motion vector of each first-type to-be-processed picture block included in each video frame of the two consecutively adjacent video frames and the determined interframe motion vector of each second-type to-be-processed picture block included in each video frame of the two consecutively adjacent video frames as an interframe motion vector between the two consecutively adjacent video frames; and interpolate a frame between the two consecutively adjacent video frames according to the interframe motion vector between the two consecutively adjacent video frames, where N is a positive integer; and a memory 1702 configured to store information about the small-object region in the preceding N video frames of the two consecutively adjacent video frames, classification information of the to-be-processed picture blocks included in each video frame in the two consecutively adjacent video frames, and the interframe motion vector between the two consecutively adjacent video frames.

During specific implementation, the processor 1701 may directly invoke a required vector or required information from the memory 1702; or the processor 1701 may send a vector or information acquiring instruction to the memory 1702, and the memory 1702 sends, to the processor 1701, a vector or information requested in the instruction sent by the processor 1701.

Preferably, the processor 1701 is configured to execute the following for the to-be-processed picture block included in each video frame of the two consecutively adjacent video frames: selecting at least one video frame from the preceding N video frames of the two consecutively adjacent video frames; determining, according to the small-object region in the preceding N video frames of the two consecutively adjacent video frames, whether a reference picture blocks that is in the selected at least one video frame and that is corresponding to the to-be-processed picture block is a picture block included in the small-object region; and if yes, determining that the to-be-processed picture block is a first-type to-be-processed picture block; otherwise, determining that the to-be-processed picture block is a second-type to-be-processed picture block.

Preferably, the processor 1701 is configured to determine a value of a dissimilarity between each candidate motion vector corresponding to the first-type to-be-processed picture block and a background motion vector of a video frame in which the first-type to-be-processed picture block is located; assign a corresponding weight to each candidate motion vector according to the determined value of the dissimilarity corresponding to each candidate motion vector by using a rule that a smaller weight is assigned to a larger value of the dissimilarity; and determine the interframe motion vector of the first-type to-be-processed picture block according to the weight assigned to each candidate motion vector and a SAD value of pixels of a picture block pointed to by each candidate motion vector and pixels of the first-type to-be-processed picture block.

Preferably, the processor 1701 is configured to select at least one preceding continuous video frame of the two consecutively adjacent video frames.

Preferably, the processor 1701 is configured to, for each candidate motion vector, determine a product of the weight assigned to the candidate motion vector and the SAD value of the pixels of the picture block pointed to by the candidate motion vector and the pixels of the first-type to-be-processed picture block, and use a candidate motion vector with a smallest product as the interframe motion vector of the first-type to-be-processed picture block.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for determining a small-object region in a video frame, comprising:
dividing a current video frame into at least two regions;
determining a motion vector corresponding to each region;
determining an interframe motion vector of each group of two adjacent frames that comprise the current video frame and reference frames of the current video frame;
determining a candidate small-object region in the current video frame according to the determined interframe motion vector of the each group of two adjacent frames and the determined motion vector corresponding to each region; and
performing filtering on the candidate small-object region in the current video frame to determine a region obtained after the filtering as a small-object region in the current video frame,
wherein the reference frames of the current video frame comprises one or more of preceding continuous video frames of the current video frame and following continuous video frames of the current video frame,
wherein before determining the interframe motion vector of each group of adjacent frames in the multiple video frames that comprise the current video frame and the reference frame of the current video frame, the method further comprises, for a to-be-processed picture block comprised in each video frame in the each group of adjacent frames in the multiple video frames that comprise the current video frame and the reference frame of the current video frame, executing the following:
selecting at least one video frame from preceding N video frames of the current video frame, wherein N is a positive integer;
determining, according to a small-object region determined in the preceding N video frames of the current video frame, whether a reference picture block that is in the selected at least one video frame and that is corresponding to the to-be-processed picture block is a picture block comprised in the small-object region;
determining that the to-be-processed picture block is a first-type to-be-processed picture block when the reference picture block that is in the selected at least one video frame and that is corresponding to the to-be-processed picture block is the picture block comprised in the small-object region; and
determining that the to-be-processed picture block is a second-type to-be-processed picture block when the reference picture block that is in the selected at least one video frame and that is corresponding to the to-be-processed picture block is not the picture block comprised in the small-object region,
wherein determining the interframe motion vector of each group of adjacent frames in the multiple video frames that comprise the current video frame and the reference frame of the current video frame comprises:
determining an interframe motion vector of each first-type to-be-processed picture block and an interframe motion vector of each second-type to-be-processed picture block; and
using the determined interframe motion vector of each first-type to-be-processed picture block comprised in each video frame in the each group of adjacent frames and the determined interframe motion vector of each second-type to-be-processed picture block comprised in each video frame in the each group of adjacent frames as the interframe motion vector of the each group of adjacent frames, and
wherein determining the interframe motion vector of each first-type to-be-processed picture block comprises:
determining a value of a dissimilarity between each candidate motion vector corresponding to the first-type to-be-processed picture block and a motion vector of a video frame in which the first-type to-be-processed picture block is located;
assigning a corresponding weight to each candidate motion vector according to the determined value of the dissimilarity corresponding to each candidate motion vector by using a rule that a smaller weight is assigned to a larger value of the dissimilarity; and
determining the interframe motion vector of the first-type to-be-processed picture block according to the weight assigned to each candidate motion vector and a Sum of Absolute Difference (SAD) value of pixels of a picture block pointed to by each candidate motion vector and pixels of the first-type to-be-processed picture block.

2. The method according to claim 1, wherein selecting the at least one video frame from the preceding N video frames of the current video frame comprises selecting at least one preceding continuous video frame of the current video frame.

3. The method according to claim 1, wherein determining the interframe motion vector of the first-type to-be-processed picture block comprises, for each candidate motion vector:
determining a product of the weight assigned to the candidate motion vector and the SAD value of the pixels of the picture block pointed to by the candidate motion vector and the pixels of the first-type to-be-processed picture block; and
using a candidate motion vector with a smallest product as the interframe motion vector of the first-type to-be-processed picture block.

4. A method for determining a small-object region in a video frame, comprising:
dividing a current video frame into at least two regions;
determining a motion vector corresponding to each region;
determining an interframe motion vector of each group of two adjacent frames that comprise the current video frame and reference frames of the current video frame;

determining a candidate small-object region in the current video frame according to the determined interframe motion vector of the each group of two adjacent frames and the determined motion vector corresponding to each region; and
performing filtering on the candidate small-object region in the current video frame to determine a region obtained after the filtering as a small-object region in the current video frame,
wherein the reference frames of the current video frame comprises one or more of preceding continuous video frames of the current video frame and following continuous video frames of the current video frame,
wherein determining the candidate small-object region in the current video frame according to the determined interframe motion vector of the each group of adjacent frames in the multiple video frames that comprise the current video frame and the reference frame of the current video frame and the determined motion vector corresponding to each region comprises:
  determining, in each reference frame of the current video frame and according to the interframe motion vector of the each group of adjacent frames in the multiple video frames that comprise the current video frame and the reference frame of the current video frame, a matching block corresponding to each picture block comprised in the current video frame;
  determining, in each reference frame, a nearby block near the matching block;
  determining an interframe motion vector of each nearby block determined in each reference frame;
  determining, for each picture block comprised in the current video frame, a value of a similarity between the interframe motion vector of each nearby block determined for the picture block and an interframe motion vector of the picture block;
  determining, for each picture block comprised in the current video frame, a value of a dissimilarity between the interframe motion vector and a motion vector that are of each nearby block; and
  determining, according to the determined value of the similarity and the determined value of the dissimilarity, a picture block comprised in the candidate small-object region in the current video frame, wherein each picture block comprised in the candidate small-object region meets the following: in multiple nearby blocks that are determined for the picture block and that are comprised in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

5. A method for determining a small-object region in a video frame, comprising:
  dividing a current video frame into at least two regions;
  determining a motion vector corresponding to each region;
  determining an interframe motion vector of each group of two adjacent frames that comprise the current video frame and reference frames of the current video frame;
  determining a candidate small-object region in the current video frame according to the determined interframe motion vector of the each group of two adjacent frames and the determined motion vector corresponding to each region; and
  performing filtering on the candidate small-object region in the current video frame to determine a region obtained after the filtering as a small-object region in the current video frame,
  wherein the reference frames of the current video frame comprises one or more of preceding continuous video frames of the current video frame and following continuous video frames of the current video frame,
  wherein before performing filtering on the candidate small-object region in the current video frame, the method further comprises marking a specific marker on each picture block comprised in the candidate small-object region, and
  wherein performing filtering on the candidate small-object region in the current video frame and determining the region obtained after the filtering as the small-object region in the current video frame comprises:
    determining, for each picture block comprised in the candidate small-object region in the current video frame, a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block;
    removing the specific marker of the picture block when the determined value of the first quantity or the determined value of the second quantity is greater than a third threshold;
    determining a value of a third quantity of picture blocks that are marked with the specific marker and that are in a third set range around the picture block;
    removing the specific marker of the picture block when the determined value of the third quantity is less than a fourth threshold; and
    determining the picture block that is marked with the specific marker and that is in the current video frame as the small-object region in the current video frame,
  wherein the third set range is smaller than the first set range and the second set range, and
  wherein the fourth threshold is less than the third threshold.

6. An apparatus for determining a small-object region in a video frame, comprising:
  a computer processor configured to:
    divide a current video frame into at least two regions;
    determine a global motion vector corresponding to each region;
    transmit the determined global motion vector;
    determine an interframe motion vector of each group of adjacent frames in multiple video frames that comprise the current video frame and a reference frame of the current video frame;
    transmit the determined interframe motion vector;
    determine information about a candidate small-object region in the current video frame according to the interframe motion vector that is of the each group of adjacent frames in the multiple video frames that comprise the current video frame and the reference frame of the current video frame and that is from the global motion vector that is corresponding to each region;
    transmit the information about the determined candidate small-object region in the current video frame;

determine the candidate small-object region in the current video frame according to the information that is about the candidate small-object region in the current video frame;
perform filtering on the candidate small-object region in the current video frame; and
determine a region obtained after the filtering as a small-object region in the current video frame,
wherein the reference frame of the current video frame comprises one or more of preceding continuous video frames of the current video frame and following continuous video frames of the current video frame,
wherein the computer processor is further configured to execute, before the interframe motion vector of the each group of adjacent frames in the multiple video frames that comprise the current video frame and the reference frame of the current video frame is determined, the following for a to-be-processed picture block comprised in each video frame in the each group of adjacent frames in the multiple video frames that comprise the current video frame and the reference frame of the current video frame:
selecting at least one video frame from preceding N video frames of the current video frame;
determining, according to a small-object region determined in the preceding N video frames of the current video frame, whether a reference picture block that is in the selected at least one video frame and that is corresponding to the to-be-processed picture block is a picture block comprised in the small-object region;
determining that the to-be-processed picture block is a first-type to-be-processed picture block when the reference picture block that is in the selected at least one video frame and that is corresponding to the to-be-processed picture block is the picture block comprised in the small-object region;
determining that the to-be-processed picture block is a second-type to-be-processed picture block when the reference picture block that is in the selected at least one video frame and that is corresponding to the to-be-processed picture block is not the picture block comprised in the small-object region;
separately determine an interframe motion vector of each first-type to-be-processed picture block and an interframe motion vector of each second-type to-be-processed picture block; and
use the determined interframe motion vector of each first-type to-be-processed picture block comprised in each video frame in the each group of adjacent frames and the determined interframe motion vector of each second-type to-be-processed picture block comprised in each video frame in the each group of adjacent frames as the interframe motion vector of the each group of adjacent frames, and
wherein the computer processor is further configured to:
determine a value of a dissimilarity between each candidate motion vector corresponding to the first-type to-be-processed picture block and a background motion vector of a video frame in which the first-type to-be-processed picture block is located;
assign a corresponding weight to each candidate motion vector according to the determined value of the dissimilarity corresponding to each candidate motion vector by using a rule that a smaller weight is assigned to a larger value of the dissimilarity; and
determine the interframe motion vector of the first-type to-be-processed picture block according to the weight assigned to each candidate motion vector and a Sum of Absolute Difference (SAD) value of pixels of a picture block pointed to by each candidate motion vector and pixels of the first-type to-be-processed picture block.

7. An apparatus for determining a small-object region in a video frame, comprising:
a computer processor configured to:
divide a current video frame into at least two regions;
determine a global motion vector corresponding to each region;
transmit the determined global motion vector;
determine an interframe motion vector of each group of adjacent frames in multiple video frames that comprise the current video frame and a reference frame of the current video frame;
transmit the determined interframe motion vector;
determine information about a candidate small-object region in the current video frame according to the interframe motion vector that is of the each group of adjacent frames in the multiple video frames that comprise the current video frame and the reference frame of the current video frame and that is from the global motion vector that is corresponding to each region;
transmit the information about the determined candidate small-object region in the current video frame;
determine the candidate small-object region in the current video frame according to the information that is about the candidate small-object region in the current video frame;
perform filtering on the candidate small-object region in the current video frame; and
determine a region obtained after the filtering as a small-object region in the current video frame,
wherein the reference frame of the current video frame comprises one or more of preceding continuous video frames of the current video frame and following continuous video frames of the current video frame, and
wherein the computer processor is further configured to:
determine, in each reference frame of the current video frame and according to the interframe motion vector of the each group of adjacent frames in the multiple video frames that comprise the current video frame and the reference frame of the current video frame, a matching block corresponding to each picture block comprised in the current video frame;
determine, in each reference frame, a nearby block near the matching block, and determine an interframe motion vector of each nearby block determined in each reference frame;
determine, for each picture block comprised in the current video frame, a value of a similarity between the interframe motion vector of each nearby block determined for the picture block and an interframe motion vector of the picture block;
determine, for each picture block comprised in the current video frame, a value of a dissimilarity between the interframe motion vector and a global motion vector that are of each nearby block; and
determine, according to the determined value of the similarity and the determined value of the dissimilarity, a picture block comprised in the candidate small-object region in the current video frame, wherein each picture block comprised in the candidate small-object region meets the following: in multiple nearby blocks that are determined for the picture block and that are comprised in each reference frame corresponding to the current video frame, there are a first set quantity of nearby blocks whose values of similarities are all greater than or equal to a first threshold and there are a second set quantity of nearby blocks whose values of dissimilarities are all greater than or equal to a second threshold.

8. An apparatus for determining a small-object region in a video frame, comprising:
a computer processor configured to:
divide a current video frame into at least two regions;
determine a global motion vector corresponding to each region;
transmit the determined global motion vector;
determine an interframe motion vector of each group of adjacent frames in multiple video frames that comprise the current video frame and a reference frame of the current video frame;
transmit the determined interframe motion vector,
determine information about a candidate small-object region in the current video frame according to the interframe motion vector that is of the each group of adjacent frames in the multiple video frames that comprise the current video frame and the reference frame of the current video frame and that is from the global motion vector that is corresponding to each region;
transmit the information about the determined candidate small-object region in the current video frame;
determine the candidate small-object region in the current video frame according to the information that is about the candidate small-object region in the current video frame;
perform filtering on the candidate small-object region in the current video frame; and
determine a region obtained after the filtering as a small-object region in the current video frame,
wherein the reference frame of the current video frame comprises one or more of preceding continuous video frames of the current video frame and following continuous video frames of the current video frame, and
wherein the computer processor is further configured to:
mark, before filtering is performed on the candidate small-object region in the current video frame, a specific marker on each picture block comprised in the candidate small-object region;
determine, for each picture block comprised in the candidate small-object region in the current video frame, a value of a first quantity of picture blocks that are marked with the specific marker and that are in a first set range in a horizontal direction of the picture block, and a value of a second quantity of picture blocks that are marked with the specific marker and that are in a second set range in a vertical direction of the picture block;
remove the specific marker of the picture block when the determined value of the first quantity or the determined value of the second quantity is greater than a third threshold;
determine a value of a third quantity of picture blocks that are marked with the specific marker and that are in a third set range around the picture block;
remove the specific marker of the picture block when the determined value of the third quantity is less than a fourth threshold; and
determine the picture block that is marked with the specific marker and that is in the current video frame as the small-object region in the current video frame, wherein the third set range is smaller than the first set range and the second set range, and the fourth threshold is less than the third threshold.

* * * * *